United States Patent
Hong

(10) Patent No.: US 11,431,422 B2
(45) Date of Patent: Aug. 30, 2022

(54) CALIBRATION METHOD FOR COOPERATIVE TRANSMISSION OF CELL-FREE WIRELESS NETWORK, AND APPARATUS THEREFOR

(71) Applicant: ELECTRONICS AND TELECOMMUNICATIONS RESEARCH INSTITUTE, Daejeon (KR)

(72) Inventor: Seung Eun Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/511,061

(22) Filed: Oct. 26, 2021

(65) Prior Publication Data

US 2022/0140920 A1   May 5, 2022

(30) Foreign Application Priority Data

Nov. 5, 2020   (KR) .................. 10-2020-0147179
Oct. 21, 2021   (KR) .................. 10-2021-0140930

(51) Int. Cl.
*H04B 17/13*   (2015.01)
*H04B 17/21*   (2015.01)
(Continued)

(52) U.S. Cl.
CPC ............. *H04B 17/13* (2015.01); *H04B 17/21* (2015.01); *H04L 5/14* (2013.01); *H04L 25/0202* (2013.01)

(58) Field of Classification Search
CPC ........ H04B 17/13; H04B 17/21; H04B 17/11; H04B 17/12; H04B 17/14; H04B 17/20;
(Continued)

(56) References Cited

U.S. PATENT DOCUMENTS 6,359,923 B1 *  3/2002  Agee ..................... H04L 5/0021
                                                            375/135
8,184,606 B2 *  5/2012  Bang ...................... H04B 17/12
                                                            342/368
(Continued)

FOREIGN PATENT DOCUMENTS

| KR | 10-2020-0033627 A | 3/2020 |
| WO | 2019-101290 A1 | 5/2019 |
| WO | 2019-125848 A1 | 6/2019 |

OTHER PUBLICATIONS

Xiwen Jiang et al., "A framework for over-the-air reciprocit calibration for TDD massive MIMO systems", IEEE Transactions on Wireless Communications, vol. 17, No. 9, Sep. 2018.

*Primary Examiner* — James M Perez
(74) *Attorney, Agent, or Firm* — LRK Patent Law Firm

(57) ABSTRACT

A method for calibration, in a serial fronthaul in which a calibration device and L (L is a natural number equal to or greater than 1) access node(s) (AN(s)) are serially connected, may include: transmitting, by the calibration device, to at least part of the L AN(s), a calibration command message indicating calibration of transmission paths; determining, by the calibration device and the at least part of the L AN(s), time delay values and phase characteristic values of the transmission paths of the at least part of the L AN(s); and transmitting, by the calibration device, to the at least part of the L AN(s), a calibration adjustment message indicating calibration of the transmission paths based on the time delay values and the phase characteristic values of the transmission paths of the at least part of the L AN(s).

20 Claims, 16 Drawing Sheets

(51) Int. Cl.
*H04L 5/14* (2006.01)
*H04L 25/02* (2006.01)

(58) Field of Classification Search
CPC ..... H04B 17/24; H04L 25/0202; H04L 5/003; H04L 5/0032; H04L 5/0035; H04W 36/0069
See application file for complete search history.

(56) References Cited

U.S. PATENT DOCUMENTS

| | | | | |
|---|---|---|---|---|
| 9,991,972 B1* | 6/2018 | Dogan | | H04B 7/0617 |
| 10,243,657 B1* | 3/2019 | Atlas | | H04B 10/25753 |
| 10,326,538 B2* | 6/2019 | Dogan | | H04B 7/0626 |
| 10,348,394 B1* | 7/2019 | Bakr | | H04L 5/14 |
| 10,461,421 B1* | 10/2019 | Tran | | H01Q 3/46 |
| 10,498,029 B1* | 12/2019 | Tran | | H01Q 1/44 |
| 10,651,954 B2* | 5/2020 | Kawamura | | H04B 7/0691 |
| 10,694,399 B1* | 6/2020 | Tran | | H01Q 3/01 |
| 10,805,811 B2* | 10/2020 | Jovanovic | | H04W 56/001 |
| 11,115,136 B1* | 9/2021 | Kim | | H04B 17/13 |
| 2004/0203472 A1* | 10/2004 | Chien | | H04L 27/0014 |
| | | | | 455/67.11 |
| 2006/0286940 A1* | 12/2006 | Izumi | | H01Q 3/2605 |
| | | | | 455/25 |
| 2009/0093222 A1* | 4/2009 | Sarkar | | H04B 17/21 |
| | | | | 455/127.2 |
| 2010/0087227 A1* | 4/2010 | Francos | | H03F 3/24 |
| | | | | 455/562.1 |
| 2011/0002371 A1* | 1/2011 | Forenza | | H04B 17/309 |
| | | | | 375/227 |
| 2012/0163428 A1* | 6/2012 | Shin | | H03F 3/602 |
| | | | | 375/219 |
| 2013/0157601 A1* | 6/2013 | O'Keeffee | | H01Q 3/267 |
| | | | | 455/226.1 |
| 2014/0073337 A1* | 3/2014 | Hong | | H04W 16/28 |
| | | | | 455/452.1 |
| 2014/0153461 A1* | 6/2014 | Lorenz | | H04W 52/0245 |
| | | | | 370/311 |
| 2015/0263835 A1* | 9/2015 | Shattil | | H04B 7/026 |
| | | | | 370/329 |
| 2016/0135180 A1* | 5/2016 | Yuan | | H04B 17/373 |
| | | | | 370/329 |
| 2016/0142186 A1* | 5/2016 | Hong | | H04L 27/2626 |
| | | | | 375/267 |
| 2017/0048009 A1* | 2/2017 | Sarkar | | H04B 7/0456 |
| 2017/0085005 A1* | 3/2017 | Aue | | H04B 1/40 |
| 2017/0237484 A1* | 8/2017 | Heath | | H04B 1/1027 |
| | | | | 398/26 |
| 2017/0257155 A1* | 9/2017 | Liang | | H04B 7/0456 |
| 2017/0367097 A1* | 12/2017 | Sohn | | H04W 74/006 |
| 2018/0076515 A1* | 3/2018 | Perlman | | H01Q 1/46 |
| 2018/0124762 A1* | 5/2018 | Zeng | | H04W 72/0406 |
| 2018/0310244 A1* | 10/2018 | Wich | | H04W 52/242 |
| 2019/0036559 A1* | 1/2019 | Wu | | H04L 25/0244 |
| 2019/0115958 A1* | 4/2019 | Liang | | H04B 7/0697 |
| 2019/0124648 A1* | 4/2019 | Sun | | H04W 72/0433 |
| 2019/0191318 A1* | 6/2019 | Jovanovic | | H04W 24/02 |
| 2019/0289497 A1* | 9/2019 | Rajagopal | | H04B 7/0456 |
| 2019/0305854 A1* | 10/2019 | Campos | | H04B 10/61 |
| 2019/0319686 A1* | 10/2019 | Chen, IV | | H04W 72/046 |
| 2019/0319868 A1* | 10/2019 | Svennebring | | H04W 24/08 |
| 2019/0334635 A1* | 10/2019 | Kawamura | | H04B 17/16 |
| 2020/0044756 A1* | 2/2020 | Sung | | H04B 10/114 |
| 2020/0068493 A1* | 2/2020 | Ding | | H04W 52/325 |
| 2020/0091608 A1* | 3/2020 | Alpman | | H01Q 25/001 |
| 2020/0100130 A1* | 3/2020 | Bahnasy | | H04W 24/10 |
| 2020/0235842 A1* | 7/2020 | Jia | | H04J 14/06 |
| 2020/0252838 A1* | 8/2020 | Akdeniz | | H04W 4/70 |
| 2020/0295851 A1* | 9/2020 | Luo | | H04B 17/11 |
| 2020/0322022 A1* | 10/2020 | Gao | | H04B 7/0452 |
| 2020/0328829 A1* | 10/2020 | Papadopoulos | | H04B 17/12 |
| 2020/0389883 A1* | 12/2020 | Faxér | | H04L 5/0025 |
| 2020/0395983 A1* | 12/2020 | Hederen | | H01Q 21/30 |
| 2021/0014085 A1* | 1/2021 | Chen | | H04L 25/0226 |
| 2021/0028870 A1* | 1/2021 | Balteanu | | H04B 17/11 |
| 2021/0029558 A1* | 1/2021 | Jovanovic | | H04W 56/001 |
| 2021/0075101 A1* | 3/2021 | Kim | | H04B 17/21 |
| 2021/0175967 A1* | 6/2021 | Cavaliere | | H04B 10/0775 |
| 2021/0234592 A1* | 7/2021 | Ashrafi | | H04B 7/0617 |
| 2021/0266764 A1* | 8/2021 | Khanfouci | | H04W 64/003 |
| 2021/0385896 A1* | 12/2021 | Kim | | H04W 76/19 |
| 2021/0391929 A1* | 12/2021 | Xiao | | H01Q 1/246 |
| 2021/0391943 A1* | 12/2021 | Djordjevic | | H04L 1/0015 |
| 2022/0021417 A1* | 1/2022 | Tawa | | H04B 17/11 |
| 2022/0029697 A1* | 1/2022 | Bakr | | H04B 7/18504 |
| 2022/0123795 A1* | 4/2022 | Kim | | H04L 5/0048 |
| 2022/0123977 A1* | 4/2022 | Jiang | | H04L 27/2605 |

\* cited by examiner

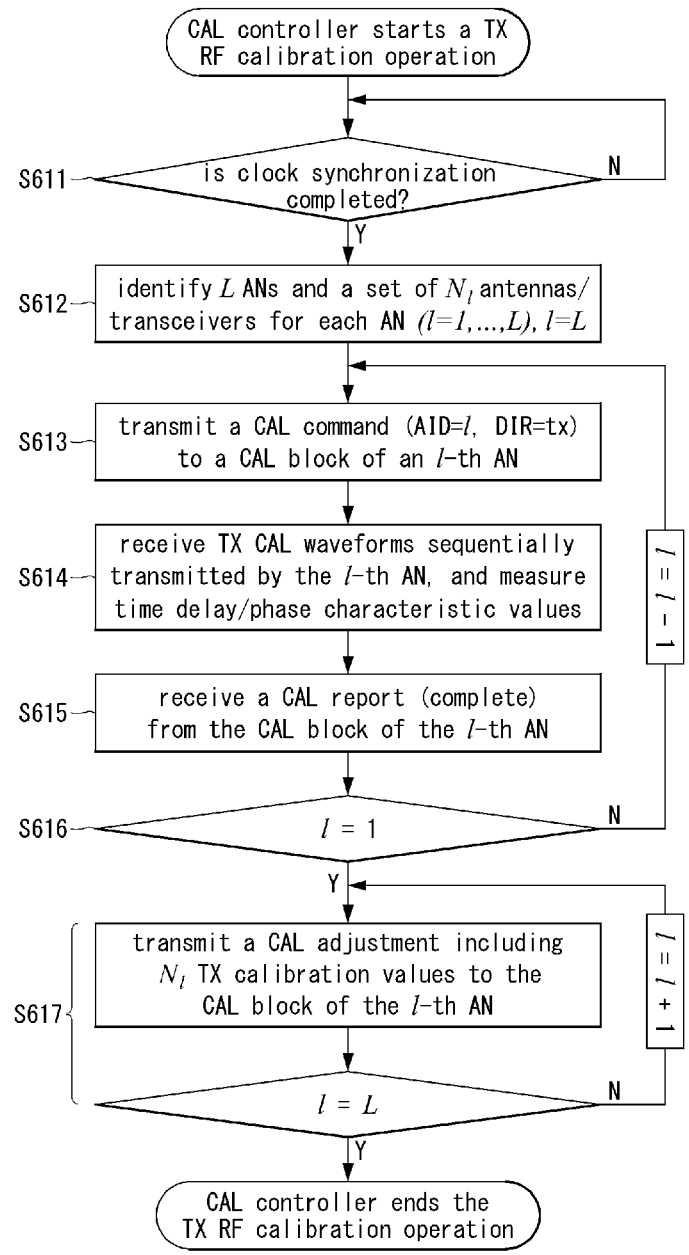

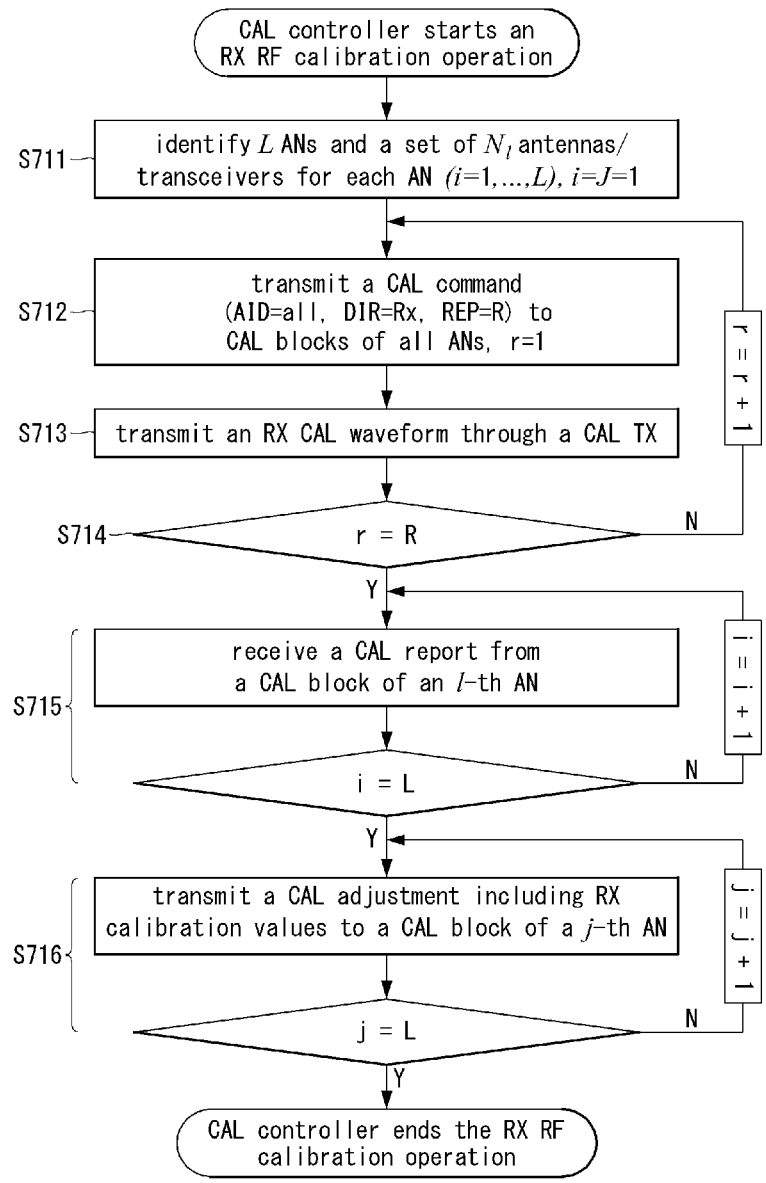

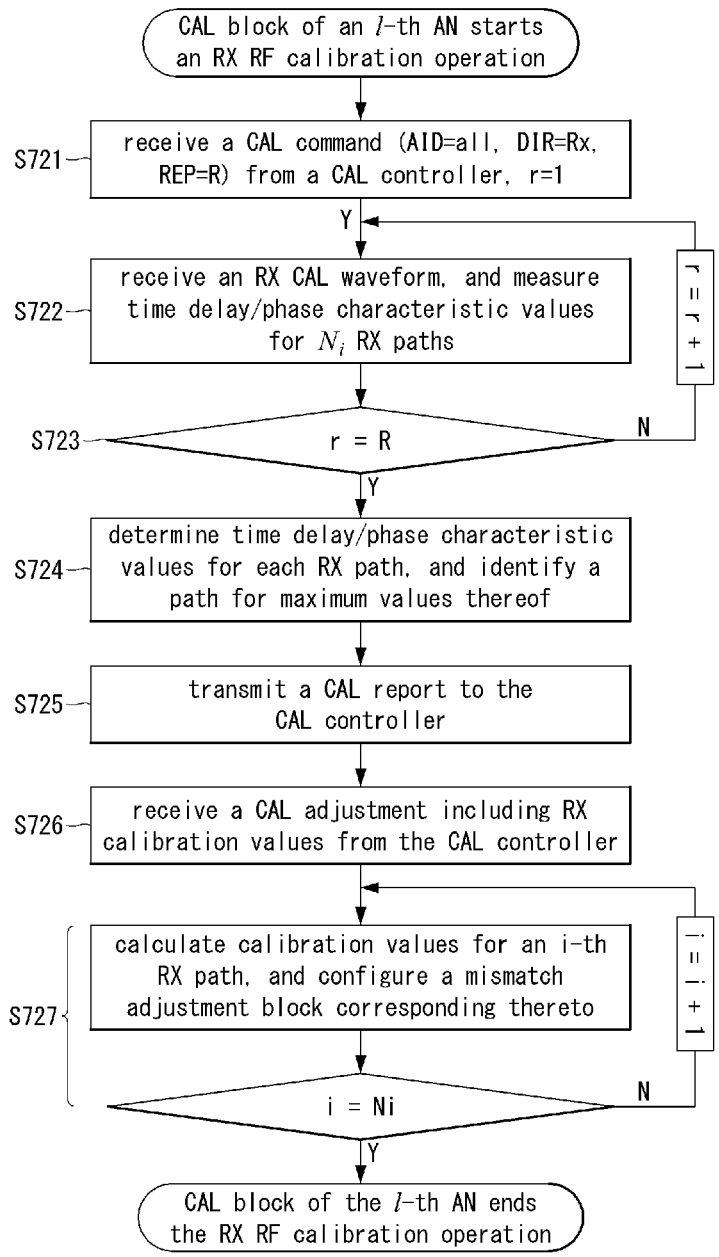

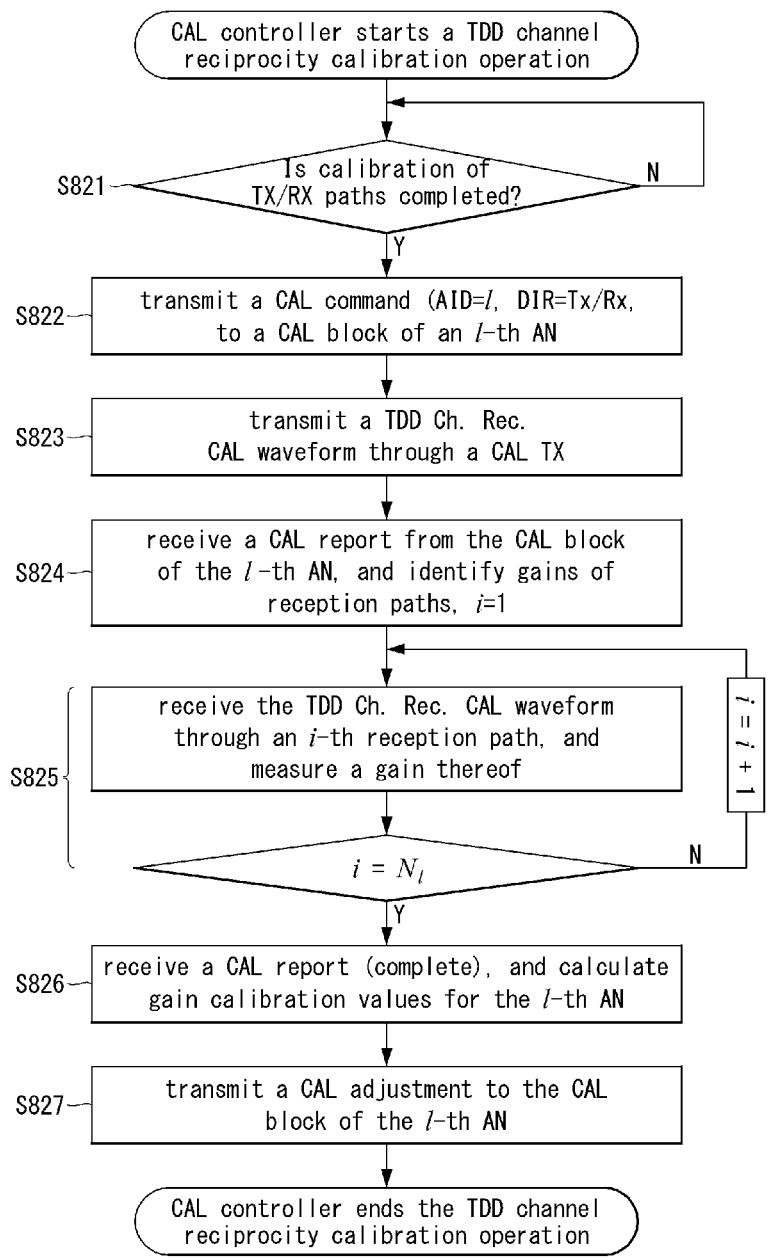

CALIBRATION METHOD FOR COOPERATIVE TRANSMISSION OF CELL-FREE WIRELESS NETWORK, AND APPARATUS THEREFOR

CROSS-REFERENCE TO RELATED APPLICATIONS

This application claims priority to Korean Patent Applications No. 10-2020-0147179 filed on Nov. 5, 2020, and No. 10-2021-0140930 filed on Oct. 21, 2021 with the Korean Intellectual Property Office (KIPO), the entire contents of which are hereby incorporated by reference.

BACKGROUND

1. Technical Field

The present disclosure relates to a cooperative communication method of distributed base station apparatuses in a radio access network (RAN), and more particularly, to a method and an apparatus for radio frequency (RF) calibration of cooperative base station apparatuses, which are required to calculate accurate precoding (beamforming) matrixes for downlink cooperative transmission based on uplink channel estimation in a cell-free massive multiple-input multiple-output (CFmMIMO) wireless communication system.

2. Description of Related Art

In a cellular wireless communication system, each user terminal is generally provided with a service by one serving base station. However, in order to provide a consistent communication quality to all user terminals while accommodating the explosively increasing mobile traffic, all base stations around a user terminal need to provide services to the user terminal without cell boundaries. Such the scheme may be defined as 'cell-free wireless communication'.

In such the cell-free wireless communication, user terminals may synchronously and simultaneously transmit their own pilot signals to all base stations according to a time division duplex (TDD) protocol. Each base station may estimate uplink channel coefficients between itself and each user terminal through the pilot signal, and may utilize TDD channel reciprocity to estimate downlink channel coefficients between itself and each user terminal. Each base station may estimate downlink channel information based on uplink channel information without feedback of channel state information from the terminal through the above-described TDD channel reciprocity. All base stations around the terminal may acquire downlink channel information with the terminal in the above-described manner, and based on the downlink channel information, precode and transmit a signal for the terminal. Accordingly, since the terminal can simultaneously receive the precoded signal based on downlink channel information from all nearby base stations no matter where the terminal is located, the terminal can receive a high-quality signal without interference with other terminals. Such the scheme in which a plurality of base stations cooperate to perform transmission to a specific terminal may be referred to as 'coherent joint transmission (hereinafter, 'C-JT'). In the cell-free wireless communication, the C-JT cooperative transmission scheme may be basically used.

As described above, in order to efficiently perform the C-JT cooperative transmission scheme in the cell-free wireless communication, bidirectional (i.e., uplink and downlink) channel information should be acquired from unidirectional (especially, uplink) channel information by utilizing the TDD channel reciprocity. In order to guarantee the TDD channel reciprocity, a characteristic difference (mismatch) of RF transmission/reception paths should be calibrated.

SUMMARY

Accordingly, exemplary embodiments of the present disclosure are directed to providing a method of performing calibration on a mismatch between transmission paths in a serial fronthaul where a calibration device and L access nodes (ANs) are serially connected.

Accordingly, exemplary embodiments of the present disclosure are directed to providing a method of performing calibration on a mismatch between reception paths in a serial fronthaul where a calibration device and L ANs are serially connected.

Accordingly, exemplary embodiments of the present disclosure are directed to providing a method of performing calibration on a time division duplex (TDD) channel reciprocity of each AN in a serial fronthaul where a calibration device and L ANs are serially connected.

According to a first exemplary embodiment of the present disclosure, a method for calibration in a serial fronthaul in which a calibration device and L (L is a natural number equal to or greater than 1) access node(s) (AN(s)) are serially connected may comprise: a step (a) of transmitting, by the calibration device, to at least part of the L AN(s), a calibration command message indicating calibration of transmission paths; a step (b) of determining, by the calibration device and the at least part of the L AN(s), time delay values and phase characteristic values of the transmission paths of the at least part of the L AN(s); and a step (c) of transmitting, by the calibration device, to the at least part of the L AN(s), a calibration adjustment message indicating calibration of the transmission paths based on the time delay values and the phase characteristic values of the transmission paths of the at least part of the L AN(s).

The step (b) may further comprise: a step (b-1) of transmitting, by an l-th AN of the at least part of the L AN(s), a transmission path calibration signal to the calibration device through each of $N_l$ transmission paths included in the l-th AN; a step (b-2) of determining, by the calibration device, a time delay value of an i-th transmission path among the $N_l$ transmission paths based on a difference between a transmission timing of the transmission path calibration signal at the l-th AN and a reception timing of the transmission path calibration signal at the calibration device; and a step (b-3) of determining, by the calibration device, a phase characteristic value of the i-th transmission path among the $N_l$ transmission paths based on a difference between a phase of the transmission path calibration signal at the transmission timing and a phase of the transmission path calibration signal at the reception timing.

The step (b) may further comprise: a step (b-4) of reporting, by the l-th AN, time delay values and phase characteristic values of the $N_l$ transmission paths to the calibration device; and a step (b-5) of determining, by the calibration device, the time delay values and the phase characteristic values of the transmission paths of the at least part of the L AN(s) through the steps (b-1) to (b-4).

The transmission path calibration signals may be sequentially transmitted at a time interval $\Delta_{tx}$ after a predetermined time $\Delta_{start}$ elapses from a transmission timing $t_0$ of the calibration command message.

The step (c) may further comprise: a step (c-1) of determining, by the calibration device, a difference between a maximum time delay value among the time delay values of the transmission paths of the at least part of the L AN(s) and a time delay value of an i-th transmission path of an l-th AN of the at least part of the L AN(s) as a time delay calibration value for the i-th transmission path; a step (c-2) of determining, by the calibration device, a difference between a maximum phase characteristic value among the phase characteristic values of the transmission paths of the at least part of the L AN(s) and a phase characteristic value of the i-th transmission path of the l-th AN of the at least part of the L AN(s) as a phase characteristic calibration value for the i-th transmission path; and a step (c-3) of transmitting, by the calibration device, the time delay calibration value and the phase characteristic calibration value of the i-th transmission path to the l-th AN through a calibration adjustment message.

The serial fronthaul may comprise: a timing clock signal line for clock synchronization between the calibration device and the L AN(s); a calibration signal line for transferring a calibration signal between the calibration device and the L AN(s); and a data and control signal line for transferring data and control signals for calibration between the calibration device and the L AN(s).

The calibration device may exist as a separate hardware device, one of the L AN(s) may serve as the calibration device, or a central processor (CP) connected to the L AN(s) through the serial fronthaul may perform a role of the calibration device.

According to a second exemplary embodiment of the present disclosure, a method for calibration in a serial fronthaul in which a calibration device and L (L is a natural number equal to or greater than 1) AN(s) are serially connected may comprise: a step (a) of transmitting, by the calibration device, to at least part of the L AN(s), a calibration command message indicating calibration of reception paths; a step (b) of determining, by the calibration device and the at least part of the L AN(s), time delay values and phase characteristic values of the reception paths of the at least part of the L AN(s); and a step (c) of transmitting, by the calibration device, to the at least part of the L AN(s), a calibration adjustment message indicating calibration of the reception paths based on the time delay values and the phase characteristic values of the reception paths of the at least part of the L AN(s).

The step (b) may further comprise: a step (b-1) of transmitting, by the calibration device, a reception path calibration signal to an l-th AN of the at least part of the L AN(s) through each of $N_l$ reception paths included in the l-th AN; a step (b-2) of determining, by the l-th AN, a time delay value of an i-th reception path among the $N_l$ reception paths based on a difference between a transmission timing of the reception path calibration signal at the calibration device, which is received through the i-th reception path, and a reception timing of the reception path calibration signal at the calibration device; a step (b-3) of determining, by the l-th AN, a phase characteristic value of the i-th reception path among the $N_l$ reception paths based on a difference between a phase of the reception path calibration signal at the transmission timing and a phase of the reception path calibration signal at the reception timing; and a step (b-4) of determining, by the l-th AN, the time delay values and the phase characteristic values of the $N_l$ reception paths through the steps (b-1) to (b-3), and reporting the time delay values and the phase characteristic values of the $N_l$ reception paths to the calibration device.

When the calibration command message indicates a number R of repeated transmissions of the reception path calibration signal, the reception path calibration signal may be repeatedly transmitted R times through the i-th reception path, and the time delay value and the phase characteristic value for the i-th reception path may be determined based on R repeated transmissions of the reception path calibration signal.

The reception path calibration signals may be sequentially transmitted at a time interval $\Delta_{rx}$ after a predetermined time $\Delta_{start}$ elapses from a transmission timing $t_0$ of the calibration command message.

The step (c) may further comprise: a step (c-1) of determining, by the calibration device, a maximum time delay value among the time delay values of the reception paths of the at least part of the L AN(s) and a maximum phase characteristic value among the phase characteristic values of the reception paths of the at least part of the L AN(s); a step (c-2) of determining, by the calibration device, a difference between the maximum time delay value and a maximum time delay value of reception paths of an l-th AN of the at least part of the L AN(s) as a time delay calibration value for the l-th AN; a step (c-3) of determining, by the calibration device, a difference between the maximum phase characteristic value and a maximum phase characteristic value of the reception paths of the l-th AN of the at least part of the L AN(s) as a phase characteristic calibration value for the l-th AN; and a step (c-4) of transmitting, by the calibration device, the time delay calibration value and the phase characteristic calibration value to the l-th AN through a calibration adjustment message.

The serial fronthaul may comprise: a timing clock signal line for clock synchronization between the calibration device and the L AN(s); a calibration signal line for transferring a calibration signal between the calibration device and the L AN(s); and a data and control signal line for transferring data and control signals for calibration between the calibration device and the L AN(s).

The calibration device may exist as a separate hardware device, one of the L ANs may serve as the calibration device, or a central processor (CP) connected to the L AN(s) through the serial fronthaul may perform a role of the calibration device.

According to a third exemplary embodiment of the present disclosure, a method for calibration in a serial fronthaul in which a calibration device and L (L is a natural number equal to or greater than 1) AN(s) are serially connected may comprise: a step (a) of transmitting, by the calibration device, to an l-th AN of the L AN(s), a calibration command message indicating calibration of a TDD channel reciprocity; a step (b) of measuring, by the calibration device and the l-th AN, gain characteristic values of $N_l$ reception paths and $N_l$ transmission paths included in the l-th AN; and a step (c) of determining, by the calibration device, a gain calibration value for each of the $N_l$ reception paths based on the gain characteristic values of the $N_l$ reception paths and the $N_l$ transmission paths, and transmitting a calibration adjustment message including the gain calibration value to the l-th AN.

The step (b) may comprise: transmitting, by the calibration device, to the l-th AN a TDD channel reciprocity calibration signal through the $N_l$ reception paths included in the l-th AN; reporting, by the l-th AN, a reception signal gain measurement value of the TDD channel reciprocity calibration signal for each of the $N_l$ reception paths; transmitting, by the l-th AN, to the calibration device a TDD channel reciprocity calibration signal through the $N_l$ transmission paths included in the l-th AN; and measuring, by the calibration device, a reception signal gain measurement value of the TDD channel reciprocity calibration signal for each of the $N_t$ transmission paths.

The TDD channel reciprocity calibration signals may be sequentially transmitted at a time interval $\Delta_{tx}$ after a predetermined time $\Delta_{start}$ elapses from a transmission timing $t_0$ of the calibration command message or a timing of reporting the reception signal gain measurement value.

The serial fronthaul may comprise: a timing clock signal line for clock synchronization between the calibration device and the L AN(s); a calibration signal line for transferring a calibration signal between the calibration device and the L AN(s); and a data and control signal line for transferring data and control signals for calibration between the calibration device and the L AN(s).

The calibration device may exist as a separate hardware device, one of the L ANs may serve as the calibration device, or a central processor (CP) connected to the L AN(s) through the serial fronthaul may perform a role of the calibration device.

Downlink channel information for the L AN(s) may be estimated from uplink channel information for the L AN(s) using the TDD channel reciprocity.

According to exemplary embodiments of the present disclosure, a mismatch between a plurality of RF transmission/reception paths can be corrected (calibrated) without wasting radio resources in a serial fronthaul environment where distributed ANs are connected through a single cable. In particular, a more accurate mismatch calibration can be performed while maintaining the simple cabling advantage of the serial fronthaul. Through this, bidirectional (uplink and downlink) channels can be estimated through unidirectional (especially, uplink) channel measurement, and services can be provided to terminals through cooperative transmission between the ANs, resulting in higher quality data transmission.

BRIEF DESCRIPTION OF DRAWINGS

FIG. 6A is a flowchart illustrating an operation of a calibration controller in the method of calibrating a mismatch of transmission paths according to FIG. 5A.

FIG. 7A is a flowchart illustrating an operation of a calibration controller in the method of calibrating a mismatch of reception paths according to FIG. 5B.

FIG. 7B is a flowchart illustrating an operation of a calibration block in the method of calibrating a mismatch of reception paths according to FIG. 5B.

FIG. 8B is a flowchart illustrating an operation of a calibration controller in a method of performing calibration for TDD channel reciprocity in a serial fronthaul according to an exemplary embodiment of the present disclosure.

DETAILED DESCRIPTION OF THE EMBODIMENTS

Figure 1:
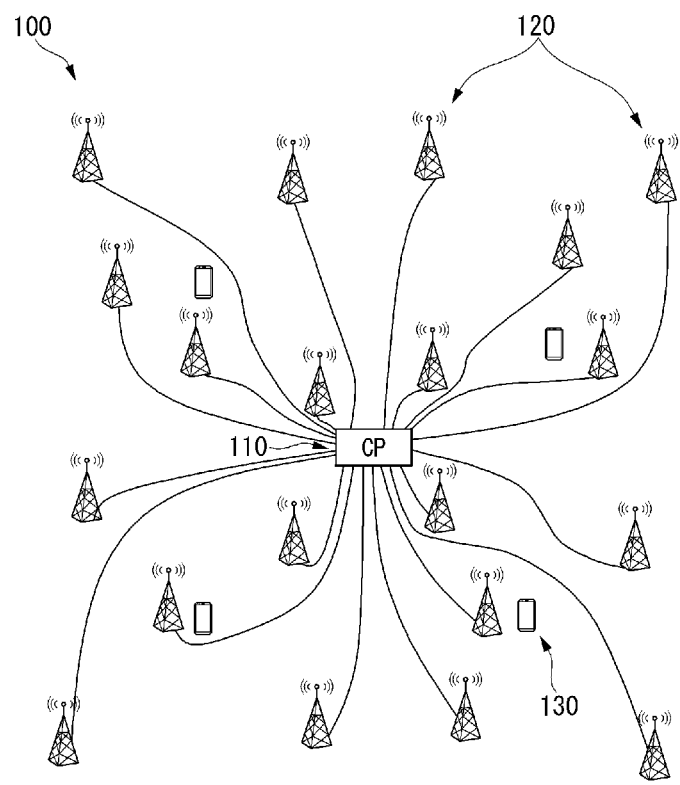
FIG. 1 is a conceptual diagram illustrating a configuration of a cell-free massive MIMO (CFmMIMO) system to which exemplary embodiments of the present disclosure are applied.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, a communication system may be used in the same meaning as a communication network.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a configuration of a cell-free massive MIMO (CFmMIMO) system to which exemplary embodiments of the present disclosure are applied.

Referring to FIG. 1, a cell-free massive MIMO system 100 may include one central processor (CP) 110, a plurality of distributed access nodes (ANs) 120, and a plurality of distributed terminals (e.g., user equipments (UEs)) 130. The functions of such the devices may be described as follows in terms of downlink cooperative transmission.

One CP 110 may be connected to the distributed ANs 120 through fronthaul links, and may transmit data for all the terminals 130 to the ANs 120 through the fronthaul links. In addition, the CP 110 may receive channel statistics information of all the terminals 130 from the distributed ANs, and may control a transmission power used by a specific AN to provide services to a specific terminal. Each AN may be connected to the CP 110 by a fronthaul link, and each AN may include one or more antennas and RF devices, and may include a part or all of baseband functions. Each AN may cooperate with other ANs to provide services to terminals. The terminal may transmit a pilot signal allocated thereto to all ANs through uplink, so that the ANs can acquire downlink channel information through channel reciprocity. In addition, the terminal may receive C-JT signals including downlink data from all the ANs.

In order for the C-JT cooperative transmission used in the cell-free wireless communication to provide high-quality signals to a terminal, accurate synchronization between the distributed ANs should be maintained, and an array antenna of a specific AN and a plurality of transmission/reception RF paths connected thereto should have the same time delay and phase shift values. In addition, for the C-JT cooperative transmission, transmission and reception RF paths should have the same time delay and phase shift values even between the ANs. Meanwhile, in the C-JT cooperative transmission used in the cell-free wireless communication, downlink channel information may be obtained from uplink channel information by utilizing the TDD channel reciprocity. The uplink channel information may include transmission (TX) RF path characteristic information of a terminal, uplink radio channel information, and reception (RX) RF path characteristic information of a base station. Downlink channel information applied to downlink data transmission may include TX RF path characteristic information of the base station, downlink radio channel information, and RX RF path characteristic information of the terminal. Accordingly, in order to apply the TDD channel reciprocity, a characteristic difference (mismatch) of RF transmission/reception paths should be corrected (calibrated).

The function of correcting the characteristic difference of the above-described RF transmission/reception paths may be referred to as 'calibration'. As the use of multiple antennas and MIMO transmission schemes are standardized, calibration functions have been developed together. An RF transmission path may include a digital-to-analog converter (DAC), up converter, power amplifier, and filter, and an RF reception path may include a duplexer (duplexer), low-noise amplifier (LNA), down converter, filter, and analog-to-digital converter (ADC). The RF transmission path and the RF reception path may be generally connected to one antenna through a switch, and a transmission function and a reception function may be performed as being temporally separated according to the TDD operation. Since individual paths include different components, each path may exhibit different delay characteristics, phase characteristics, and gain characteristics. The conventional calibration techniques are limited to calibration that adjusts mismatches of a plurality of transmission/reception paths due to the use of multiple antennas within one base station. Accordingly, there is a need for a calibration technique for mismatches of transmission/reception paths between a plurality of ANs to cost-effectively support the C-JT cooperative transmission in the cell-free wireless communication.

The conventional cell-free MIMO system requires a dedicated fronthaul link for each of the ANs as shown in FIG. 1. Each AN may pre-process a signal (e.g., pilot signal) received on the uplink, calculate a channel estimate, and deliver the calculated channel estimate to the CP over its dedicated fronthaul link. Also, the CP may generate a precoded signal based on the received channel estimates, and deliver the precoded signal to each AN. The above-described architecture may be preferable from the viewpoint of communication performance, but has a problem from the viewpoint of costs because a large number of long cables are required.

Figure 2:
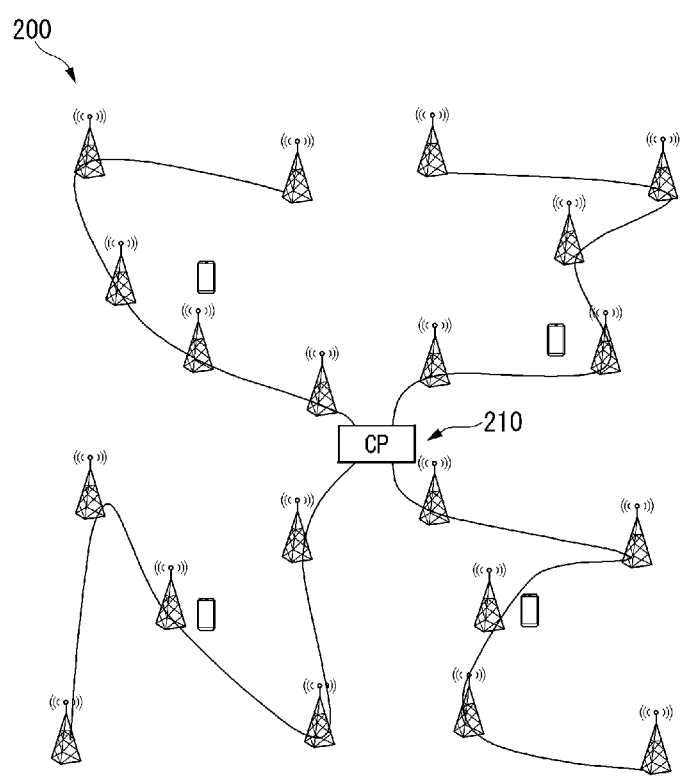
FIG. 2 is a conceptual diagram illustrating a configuration of a cell-free massive MIMO system using a serial fronthaul to which exemplary embodiments of the present disclosure are applied.

FIG. 2 is a conceptual diagram illustrating a configuration of a cell-free massive MIMO system using a serial fronthaul to which exemplary embodiments of the present disclosure are applied.

Referring to FIG. 2, in order to enable a more practical architecture and distributed processing, a CFmMIMO system 200, where one fronthaul cable connects multiple ANs in series in a daisy-chain manner to reduce cabling, is shown.

However, calibration techniques for resolving a problem of mismatches of transmission/reception paths within the same AN and transmission/reception paths between distributed ANs and a problem of TDD channel non-reciprocity due to a mismatch between transmission/reception paths with the same transceiver have not been considered.

Configuration of a Serial Fronthaul Calibration System

Figure 3:
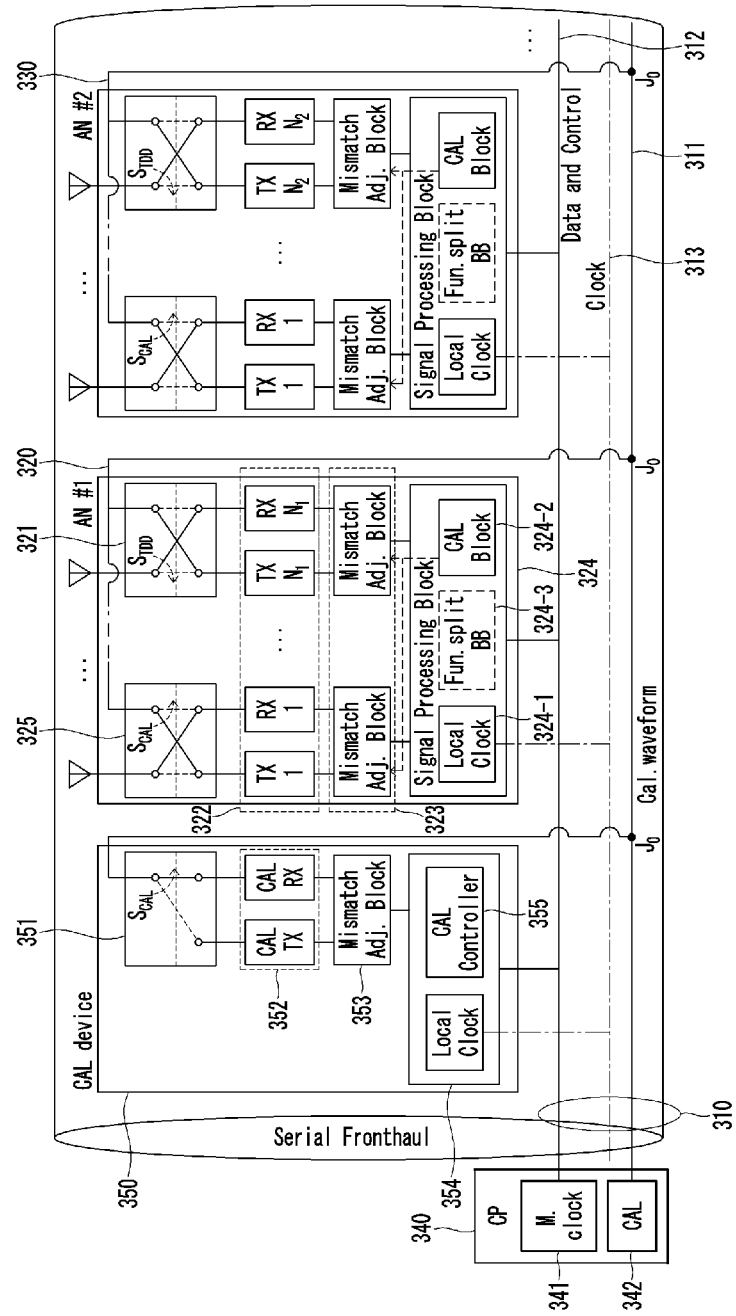
FIG. 3 is a conceptual diagram illustrating a configuration of a serial fronthaul system to which a serial fronthaul calibration method according to an exemplary embodiment of the present disclosure is applied.

FIG. 3 is a conceptual diagram illustrating a configuration of a serial fronthaul system to which a serial fronthaul calibration method according to an exemplary embodiment of the present disclosure is applied.

Referring to FIG. 3, a serial fronthaul 310 may connect L (L is a natural number greater than or equal to 1) AN(s) (e.g., 320 and 330) in series. Each AN #1 connected to the serial fronthaul 310 (hereinafter, the AN #l is exemplified with the AN #1) may include a plurality of antennas (e.g., $N_l$ antennas), a switch 321 (hereinafter, 'TDD switch ($S_{TDD}$)') for switching the antennas between a transmission path and a reception path according to a TDD protocol, transceivers 322 (TX i and RX i, i=1, . . . , $N_l$) connected to corresponding antennas through the switch 321, mismatch adjustment blocks 323 adjusting the mismatches between the transceivers, and a signal processing module 324 performing interface and signal processing functions with a CP 340.

The signal processing module 324 may include a local clock 324-1 that provides timing for internal operations of the AN #l, a calibration block 324-2 to be described later, and a baseband function block 324-3 functionally split from the CP 340. In addition, the AL #1 may further include a switch 325 (hereinafter, referred to as 'CAL switch ($S_{CAL}$)') for connecting a calibration signal line 311 of the fronthaul 310 to the transmission path and reception path of the transceiver 322 in conjunction with the TDD switch 321. Further describing the interworking of the TDD switch 321 and the CAL switch 325, when the antennas are used for transmission according to the TDD protocol, the TDD switch 321 may connect the antennas with TX parts of the transceivers 322, and the CAL switch 325 may connect the calibration signal line 311 to RX parts of the corresponding transceivers 322. On the other hand, when the TDD switch 321 connects the antennas to the RX parts of the transceivers 322, the CAL switch 325 may connect the calibration signal line 311 to the TX parts of the transceivers 322.

As shown in FIG. 3, the plurality of ANs each including the above-described components may be connected with each other through a data and control signal line 312, a timing clock signal line 313, and the calibration signal line 311 included in the serial fronthaul 310. Further, the plurality of ANs may be also connected to the CP 340 through the serial fronthaul 310. In the following exemplary embodiments relating to calibration in the serial fronthaul, the data and control signal line 312 may be used for exchanging information for the calibration among the CP 340, a calibration controller 355 in a calibration device 350, and the calibration blocks 324-2 in the individual AN. The timing clock signal line 313 may connect a master clock 341 of the CP 340 that provides a reference clock and the internal local clocks 324-1 of the distributed ANs to support synchronization therebetween. For the calibration signal line 311, a circuit length from a CAL switch 351 of the calibration device 350 to a point $J_0$, a circuit length from the CAL switch 325 of each antenna of the AN #1 320 to a point $J_1$, and a circuit length from the CAL switch 325 of each antenna of the AN #l (l=2, . . . , L) to a point $J_l$ may all be designed to have exact fixed lengths. In the following exemplary embodiments, it is assumed that the circuit lengths are all the same. Although not separately mentioned below, an additional calibration circuit may be used to assume the same circuit length.

As described above, the serial fronthaul according to an exemplary embodiment of the present disclosure may include the calibration device 350 for adjusting RF mismatches of a series of ANs connected by the serial fronthaul. Although the exemplary embodiment in which the calibration device 350 exists as an independent device is shown in FIG. 3, exemplary embodiments in which a specific AN performs the role of the calibration device or the CP 340 performs the role of the calibration device are also possible. In the following description, an exemplary embodiment in which one independent calibration device 350 is included in the serial fronthaul is considered.

The calibration device 350 may include the CAL switch 351 for connecting a calibration transceiver 352 to the calibration signal line 311 of the serial fronthaul 310 according to the TDD protocol, a transceiver 352 comprising a calibration TX part (CAL TX part) for transmitting a calibration signal (e.g., calibration waveform signal) and a calibration RX part (CAL RX part) for receiving a calibration signal, a mismatch adjustment block 353 for adjusting a mismatch between the TX/RX parts of the calibration transceiver, a local clock 354 that provides timing $t_0$ the components of the calibration device, and a calibration controller 355 to be described later.

Figure 4:
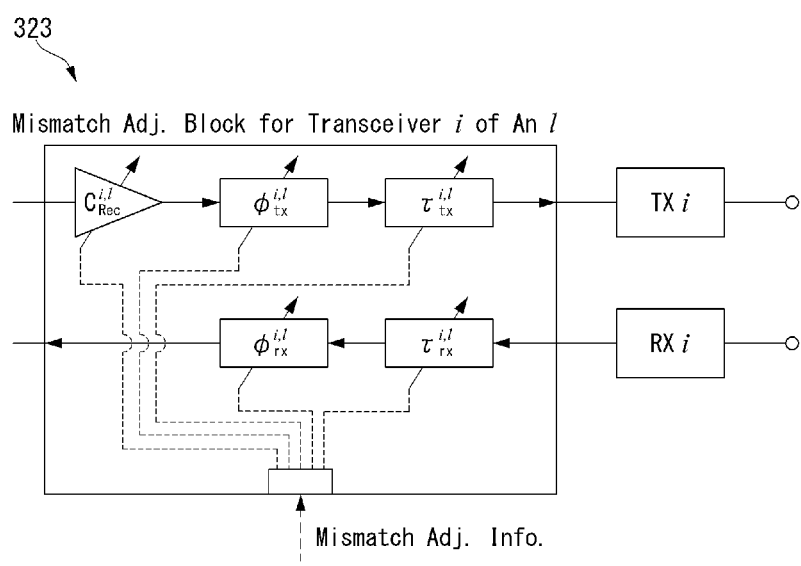
FIG. 4 is a conceptual diagram illustrating a mismatch adjustment block according to an exemplary embodiment of the present disclosure.

FIG. 4 is a conceptual diagram illustrating a mismatch adjustment block according to an exemplary embodiment of the present disclosure.

Referring to FIG. 4, a configuration of a mismatch adjustment block 323 for adjusting a mismatch of the i-th (i=1, . . . , $N_l$) transceiver in the AN #l (l=1, . . . , L) having $N_l$ antennas is shown. That is, the $N_l$ transceivers and the mismatch adjustment blocks may have a one-to-one correspondence.

Each mismatch adjustment block may include a transmission delay adjuster $\tau_{tx}^{i,l}$ and a transmission phase adjuster $\phi_{tx}^{i,l}$ for calibrating a time delay and a phase of a transmission path of a corresponding transceiver, a reception delay adjuster $\tau_{rx}^{i,l}$ and a reception phase adjuster $\phi_{rx}^{i,l}$ for calibrating a time delay and a phase of a reception path of the transceiver, and a gain adjuster $C_{Rec}^{i,l}$ for adjusting a channel non-reciprocity between the transmission path and the reception path of the transceiver.

Calibration values for the mismatch adjustment blocks of the transceiver may be provided from the calibration block 324-2 of the corresponding AN through cooperation with the calibration device 350. In an exemplary embodiment, the mismatch adjustment block 323 may be implemented as an additional HW block. However, exemplary embodiments in which the mismatch adjustment block 323 is implemented in software within the baseband function block 324-3 are also possible.

Hereinafter, with reference to FIGS. 3 and 4, methods for calibrating the time delay and phase mismatch of transmission/reception paths of a plurality of transceivers within an AN, the time delay and phase mismatch of transmission/reception paths of a plurality of transceivers of ANs, and the TDD channel non-reciprocity mismatch of a transceiver will be described. In the following description, it is assumed that the master clock 341 of the CP 340 is accurately synchronized with the local clocks of the calibration device 350 and all the ANs 320 and 330. Also, message delivery over the data and control signal line 312 may be assumed to have no error. The calibration controller 355 of the calibration device 350 may instruct the calibration to be performed by designating a specific transceiver of a specific AN connected to the serial fronthaul through the serial fronthaul data and control signal line 312 at an arbitrary time point, or instruct the calibration to be performed for all transceivers of all ANs.

Transmission/Reception Path Calibration

Figure 5A:
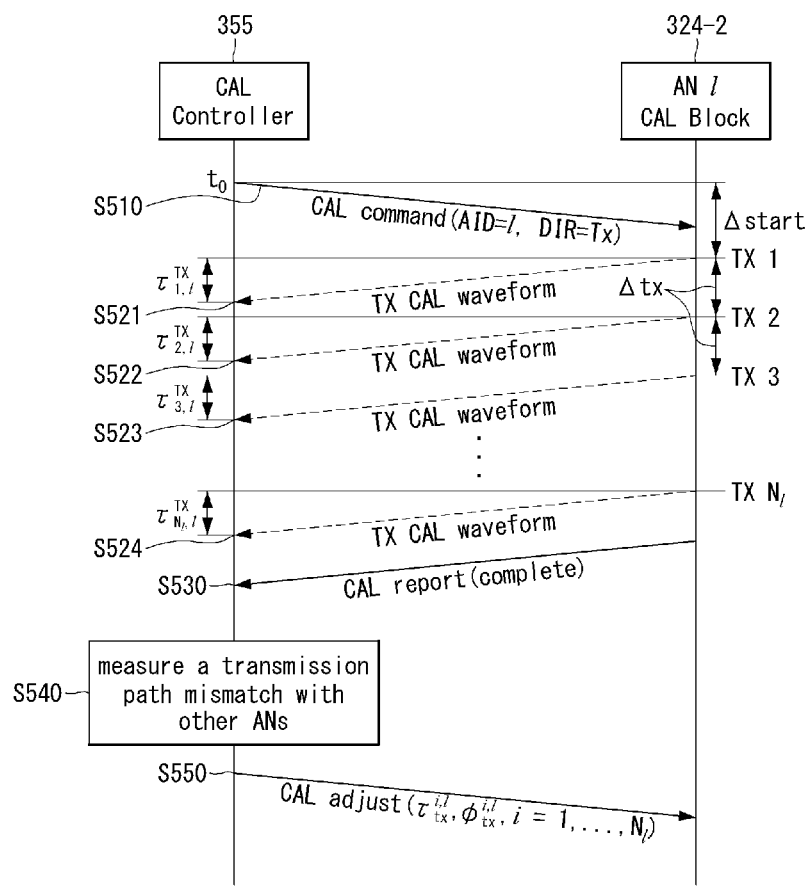
FIGS. 5A and 5B are sequence charts illustrating a method of calibrating mismatch of transmission paths and/or reception paths in a serial fronthaul according to an exemplary embodiment of the present disclosure.
Figure 5B:
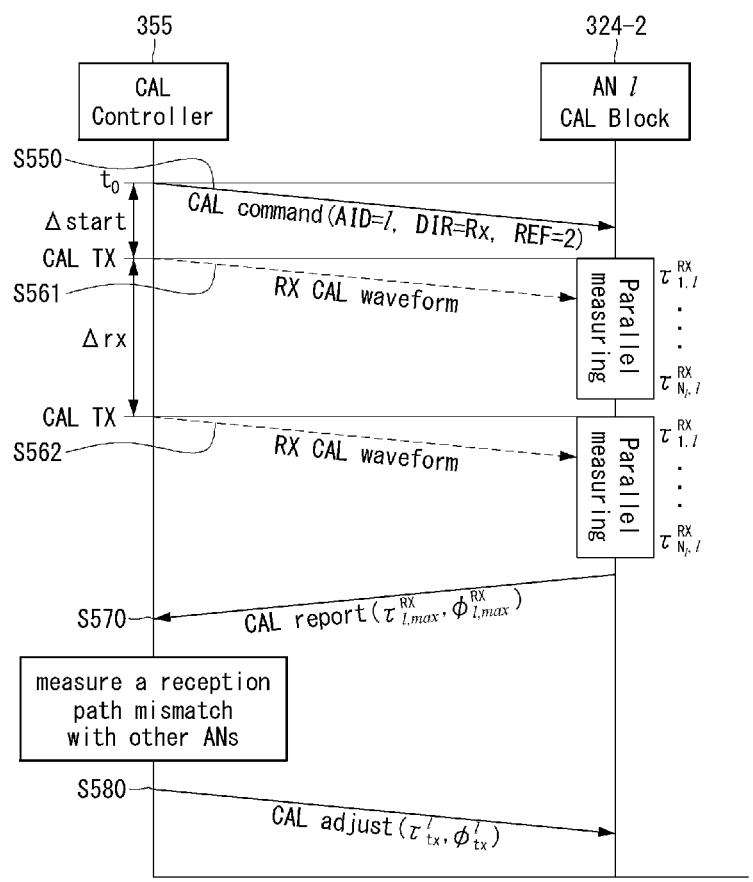

FIGS. 5A and 5B are sequence charts illustrating a method of calibrating mismatch of transmission paths and/or reception paths in a serial fronthaul according to an exemplary embodiment of the present disclosure.

In FIG. 5A, a procedure of exchanging messages and calibration signals for calibrating a mismatch of transmission paths between the calibration controller 355 of the calibration device 350 and the calibration block 324-2 of the AN #1 is shown. In addition, in FIG. 5B, a procedure for exchanging messages and calibration signals for calibrating a mismatch of reception paths between the calibration controller 355 of the calibration device 350 and the calibration block 324-2 of the AN #1 is shown.

Referring to FIG. 5A, in order to initiate measurement of time delay and phase characteristics of $N_l$ transmission paths of the AN #1, the calibration controller 355 may transmit a calibration command message (AID=l, DIR=Tx) to the calibration block 324-2 of the AN #1 through the data and control signal line 312 of the serial fronthaul 310 (S510). Here, the AID may indicate an identifier (i.e., AN ID) of the AN, and the DIR may indicate target paths (i.e., transmission paths or reception paths) for measuring a mismatch. In the exemplary embodiment of FIG. 5A, the DIR may be set to 'Tx', which means that the targets of mismatch calibration are the transmission paths. The calibration block 324-2 of the AN #1 may transmit a transmission path calibration signal (i.e., TX CAL waveform) after $\Delta_{start}$ elapses from a timing $t_0$ at which the calibration command message is transmitted (S521). Since the clocks of the calibration block 324-2, which is an entity transmitting the transmission path calibration signal, and the calibration controller 355, which is an entity receiving the transmission path calibration signal, are in a synchronized state, the calibration controller 355 may transmit the timing $t_0$ in form of a time stamp by including it in the calibration command message, and the calibration block 324-2 may transmit the transmission path calibration signal on a transmission path 1 (i.e., TX 1) at the timing $t_0+\Delta_{start}$ (S521). The calibration block 324-2 may sequentially transmit a total of $N_l$ transmission path calibration signals at an interval of $\Delta_{tx}$ on the paths TX 1, TX 2, . . . , and TX $N_l$ (S521 to S524). After transmitting the last transmission path calibration signal (S524), the calibration block 324-2 may notify that transmission of the transmission path calibration signals has been completed by transmitting a calibration completion report (e.g. CAL report (complete)) message to the calibration controller 355 through the data and control signal line 312 (S530). On the other hand, the calibration controller 355 should make a time interval from the timing $t_0+\Delta_{start}$ to a timing $t_0+\Delta_{start}+(N_l-1)\Delta_{tx}$ become a radio reception operation period of the AN #1 according to the TDD protocol. A time delay value $\tau_{i,l}^{TX}$ of the transmission path calibration signal transmitted through the path TX i ($1\leq i\leq N_l$) of the AN #1 may be defined as a difference between a transmission timing $t_0+\Delta_{start}+(i-1)\Delta_{tx}$ of a corresponding transmission path calibration signal at the calibration block 324-2 and a reception timing of the transmission path calibration signal at the calibration controller 355, and may be expressed as Equation 1 below according to the transmission path of the transmission path calibration signal.

$$\tau_{i,l}^{TX} = \tau_{TX\,i,l} + \tau_{J_l}^{TX} + \tau_{J_l\text{-}J_0}^{TX} + \tau_{J_0}^{TX} + \tau_{CAL\,RX} \quad \text{[Equation 1]}$$

In Equation 1, $\tau_{TX\,i,l}$ may be the time delay value of the path TX i of the AN #1 that is the calibration target, $\tau_{J_l}^{TX}$ may be a time delay value from a point of $S_{CAL}$ of the AN #1 to a point $J_l$, $\tau_{J_l\text{-}J_0}^{TX}$ may be a time delay value from the point $J_l$ to a point $J_0$, $\tau_{J_0}^{TX}$ may be a time delay value from a point of $S_{CAL}$ of the calibration device 350 to the point $J_0$, and $\tau_{CAL\,RX}$ may be a time delay value of the RX path of the calibration device 350. The above-described $\tau_{J_l}^{TX}, \tau_{J_0}^{TX}$, and $\tau_{J_l\text{-}J_0}^{TX}$ may be well-known fixed values, and $T_{CAL\,RX}$ may be a component value of a common path for measurement of $\tau_{i,l}^{TX}, \forall i, \forall l$. Accordingly, the value of $\tau_{TX\,i,l}$ may be derived from the measured value of $\tau_{i,l}^{TX}$.

That is, the phase characteristic value of the path TX i ($1\leq i\leq N_l$) of the AN #1 may be determined based on a difference between a phase at the transmission timing and a phase at the reception timing of the transmission path calibration signal transmitted through the path TX i. In addition, the phase measurement value $\phi_{i,l}^{TX}$ of the transmission path calibration signal transmitted through the path TX i ($1\leq i\leq N_l$) of the AN #1 may be expressed as Equation 2 below according to the transmission path of the transmission path calibration signal.

$$\phi_{i,l}^{TX} = \phi_{TX\,i,l} + \phi_{J_l}^{TX} + \phi_{J_l\text{-}J_0}^{TX} + \phi_{J_0}^{TX} + \phi_{CAL\,RX} \quad \text{[Equation 2]}$$

In Equation 2, $\phi_{TX\,i,l}$ may be the phase characteristic value of the path TX i of the AN #1 that is the calibration target, $\phi_{J_l}^{TX}$ may be a phase characteristic value from the point of $S_{CAL}$ of the AN #1 to the point $J_l$, $\phi_{J_l\text{-}J_0}^{TX}$ may be a phase characteristic value from the point $J_l$ to the point $J_0$, $\phi_{J_0}^{TX}$ may be a phase characteristic value from the point of $S_{CAL}$ of the calibration device 350 to the point $J_0$, and $\phi_{CAL\,RX}$ may be a phase characteristic value of the RX path of the calibration device 350. The above-described $\phi_{J_l}^{TX}, \phi_{J_0}^{TX}$, and $\phi_{J_l\text{-}J_0}^{TX}$ may be well-known fixed values, and ah $\phi_{CAL\,RX}$ may be a component value of a common path for measurement of $\phi_{i,l}^{TX}, \forall i, \forall l$. Accordingly, the value of $\phi_{TX\,i,l}$ may be derived from the measured value of $\phi_{i,l}^{TX}$. The calibration controller 355 may complete the measurement of the time delay values $\phi_{TX\,i,l}$ ($1\leq i\leq N_l$) and the phase characteristic values $\phi_{TX\,i,l}$ ($1\leq i\leq N_l$) of the $N_l$ transmission paths of the AN #1 by receiving the calibration completion report (i.e., report (complete)) message from the calibration block 324-2 of the AN #1.

The calibration controller 355 of the calibration device 350 may perform the above-described procedure with each of the other ANs (S540). After completing mismatch measurement for a total of $\Sigma_{l=1}^{L} N_l$ transmission paths for a total of the L ANs included in the serial fronthaul, the maximum time delay value $\max_{i,m}\tau_{TX\,i,m}$ and the maximum phase characteristic value $\max_{i,m}\phi_{TX\,i,m}$ may be derived. The calibration controller 355 may transmit, to the calibration block 324-2 of the AN #1, a calibration adjustment message including time delay and phase characteristic calibration values $\tau_{tx}^{i,l}, \phi_{tx}^{i,l}$ i=1, . . . , $N_l$ of the $N_l$ transmission paths of the AN #1 (S550). The time delay and phase characteristic calibration values $\tau_{tx}^{i,l}, \tau_{tx}^{i,l}$ for the i-th transmission path of the AN #1 may be expressed as Equation 3 below.

$$\tau_{tx}^{i,l} = \max_{i,m}\tau_{TXi,m} - \tau_{TXi,l} \quad \text{[Equation 3]}$$

$$\phi_{tx}^{i,l} = \max_{i,m}\phi_{TXi,m} - \phi_{TXi,l}$$

Referring to FIG. 5B, in order to initiate measurement of time delay and phase characteristics of $N_l$ reception paths of the AN #1, the calibration controller 355 may transmit a calibration command message (AID=l, DIR=Rx, REP=n) to the calibration block 324-2 of the AN #l through the data and control signal line 312 of the serial fronthaul 310 (S550). Here, the AID may indicate an identifier (i.e., AN ID) of the AN, and the DIR may indicate target paths (i.e., transmission paths or reception paths) for measuring a mismatch. In the exemplary embodiment of FIG. 5B, the DIR may be set to 'Rx', which means that the targets of mismatch calibration are the reception paths. In addition, the REP may mean the number of times of transmission of a reception path calibration signal (i.e., RX CAL waveform) for mismatch measurement. The calibration controller 355 may transmit the reception path calibration signal (i.e., RX CAL waveform) after $\Delta_{start}$ elapses from a timing $t_0$ at which the calibration command message is transmitted (S561). Since the clocks of the calibration block 324-2, which is an entity receiving the reception path calibration signal, and the calibration controller 355, which is an entity transmitting the reception path calibration signal, are in a synchronized state, the calibration controller 355 may transmit the timing $t_0$ in form of a time stamp by including it in the calibration command message, and may transmit the reception path calibration signal on the calibration TX path at the timing $t_0+\Delta_{start}$. The calibration controller 355 may sequentially transmit a total of (REP=n) reception path calibration signals at an interval of $\Delta_{rx}$ on the same calibration TX path (S561 to S562). On the other hand, the calibration controller 355 should allow the repeatedly-transmitted reception path calibration signals to be received on the reception path of the AN #l in a radio transmission operation period of the AN #l according to the TDD protocol. A time delay value $\tau_{i,l}^{RX}$ of the n-th (1≤n≤Rep) reception path calibration signal received through the path RX i(1≤i≤$N_l$) of the AN #l may be defined as a difference between a transmission timing $t_0+\Delta_{start}+(n-1)\Delta_{rx}$ of a corresponding reception path calibration signal at the calibration controller 355 and a reception timing of the reception path calibration signa at the calibration block 325-4, and may be expressed as Equation 4 below according to the reception path of the reception path calibration signal.

$$\tau_{i,l}^{RX} = \tau_{RX\,i,l} + \tau_{J_l}^{RX} + \tau_{J_l-J_0}^{RX} + \tau_{J_0}^{RX} + \tau_{CAL\,TX} \qquad [\text{Equation 4}]$$

In Equation 4, $\tau_{RX\,i,l}$ may be the time delay value of the path RX i of the AN #l that is the calibration target, $\tau_{J_l}^{RX}$ may be a time delay value from the point of $S_{CAL}$ of the AN #l to the point $J_l$, $\tau_{J_l J_0}^{RX}$ may be a time delay value from the point $J_l$ to the point $J_0$, $\tau_{J_0}^{RX}$ may be a time delay value from the point of $S_{CAL}$ of the calibration device 350 to the point $J_0$, and $\tau_{CAL\,TX}$ may be a time delay value of the TX path of the calibration device 350. The above-described $\tau_{J_l}^{RX}$, $\tau_{J_0}^{RX}$, and $\tau_{J_l-J_0}^{RX}$ may be well-known fixed values, and $\tau_{CAL\,TX}$ may be a component value of a common path for measurement of $\tau_{i,l}^{RX}$, $\forall i$, $\forall l$. Accordingly, the value of $\tau_{RX\,i,l}$ may be derived from the measured value of $\tau_{i,l}^{RX}$.

In addition, the phase measurement value $\phi_{i,l}^{RX}$ of the reception path calibration signal received through the path RX i (1≤i≤$N_l$) of the AN #l may be expressed as Equation 5 below according to the reception path of the transmission path calibration signal.

$$\phi_{i,l}^{RX} = \phi_{RX\,i,l} + \phi_{J_l}^{RX} + \phi_{J_l-J_0}^{RX} + \phi_{J_0}^{RX} + \phi_{CAL\,TX} \qquad [\text{Equation 5}]$$

In Equation 4, $\phi_{RX\,i,l}$ may be the phase characteristic value of the path RX i of the AN #l that is the calibration target, $\phi_{J_l}^{RX}$ may be a phase characteristic value from the point of $S_{CAL}$ of the AN #l to the point $J_l$, $\phi_{J_l-J_0}^{RX}$ may be a phase characteristic value from the point $J_l$ to the point $J_0$, $\phi_{J_0}^{RX}$ may be a phase characteristic value from the point of $S_{CAL}$ of the calibration device 350 to the point $J_0$, and ah $\phi_{CAL\,TX}$ may be a phase characteristic value of the TX path of the calibration device 350. The above-described $\phi_{J_l}^{RX}$, $\phi_{J_0}^{RX}$, and $\phi_{J_l-J_0}^{RX}$ may be well-known fixed values, and ah $\phi_{CAL\,TX}$ may be a component value of a common path for measurement of $\phi_{i,l}^{RX}$, $\forall i$, $\forall l$. Accordingly, the value of $\phi_{RX\,i,l}$ may be derived from the measured value of $\phi_{i,l}^{RX}$.

According to an exemplary embodiment of the present disclosure, $\tau_{i,l}^{RX}$ (1≤i≤$N_l$) and $\phi_{i,l}^{RX}$ (1≤i≤$N_l$) for all the $N_l$ reception paths of the AN #l may be parallelly measured through one reception path calibration signal transmitted by the calibration controller 355. In such the exemplary embodiment, the calibration block 324-2 of the AN #l may obtain average values of $\tau_{i,l}^{RX}$ and $\phi_{i,l}^{RX}$ derived by the repeatedly-received reception path calibration signals, thereby minimizing the measurement errors.

In another exemplary embodiment of the present disclosure, measurements may be made for a part of the $N_l$ reception paths through one reception path calibration signal transmitted by the calibration controller. In this case, measurements for all the reception paths may be completed through the repeated reception path calibration signals. The calibration block 324-2, which has completed the measurements for all the $N_l$ reception paths of the AN #l, may determine the maximum time delay measurement value $\tau_{l,max}^{RX}$ and the maximum phase characteristic value $\phi_{l,max}^{RX}$ as in Equation 6 below.

$$\tau_{l,max}^{RX} = \max_i \tau_{i,l}^{RX} \qquad [\text{Equation 6}]$$

$$\phi_{l,max}^{RX} = \max_i \phi_{i,l}^{RX}$$

The AN #l may report the two measured maximum values $\tau_{l,max}^{RX}$ and $\phi_{l,max}^{RX}$ determined as described above to the calibration controller 355 through a calibration report message (S570).

The calibration controller 355 of the calibration device 350 may perform the above-described procedure with each of the other ANs (S580). After completing mismatch measurement for a total of $\Sigma_{l=1}^{L} N_l$ reception paths for a total of the L ANs (or, a part of the L ANs) included in the serial fronthaul, the calibration controller 355 may derive the maximum time delay value $\max_{i,m} \tau_{RX\,i,m}$ and the maximum phase characteristic value $\max_{i,m} \phi_{RX\,i,m}$. The calibration controller 355 may calculate the time delay calibration value $\tau_{rx}^{l}$ and the time characteristic calibration value $\phi_{rx}^{l}$ based on the maximum time delay measurement value $\tau_{l,max}^{RX}$ and the phase characteristic measurement value $\phi_{l,max}^{RX}$ of the reception paths of the AN #l as in Equation 7 below.

$$\tau_{rx}^{l} = \max_{i,m} \tau_{RX i,m} - \max_i \tau_{RX i,l} \qquad [\text{Equation 7}]$$

$$\phi_{rx}^{l} = \max_m \phi_{m,max}^{RX} - \phi_{l,max}^{RX}$$

Thereafter, the calibration controller 355 may transmit, to the calibration block 324-2 of the AN #l, a calibration adjustment message including the time delay and phase characteristic calibration values $\tau_{rx}^{l}$ and $\phi_{rx}^{l}$ (S580). The time delay and phase characteristic calibration values $\tau_{rx}^{l}$ and $\phi_{rx}^l$ for the i-th reception path of the AN #1 may be expressed as Equation 8 below.

$$\tau_{rx}^{i,l} = \tau_{rx}^l + (\tau_{l,max}^{RX} - \tau_{i,l}^{RX})$$

$$\phi_{rx}^{i,l} = \phi_{rx}^l + (\phi_{l,max}^{RX} - \phi_{i,l}^{RX}) \qquad \text{[Equation 8]}$$

Hereinafter, with respect to the procedures described through FIGS. 5A and 5B, an operation procedure on the side of the calibration controller 355 of the calibration device 350 and an operation procedure on the side of the calibration block 324-2 of the AN #1 will be described, respectively.

FIG. 6A is a flowchart illustrating an operation of a calibration controller in the method of calibrating a mismatch of transmission paths according to FIG. 5A.

Referring to FIG. 6A, the calibration controller 355 may determine whether clock synchronization with ANs subjected to the transmission path mismatch calibration has been completed (S611), and may identify L ANs and a set of $N_l$ antennas/transceivers included in each AN (S612).

The calibration controller 355 may transmit a calibration command message (AID=l, DIR=Tx) to the calibration block 324-2 of the AN #1 among the L ANs (S613). That is, the step S613 may correspond to the step S510 in FIG. 5A.

Then, the calibration controller 355 may receive the transmission path calibration signals (i.e., TX CAL waveforms) sequentially transmitted from the calibration block 324-2 of the AN #1 among the L ANs, and use them to measure the time delay values and phase characteristic values of the transmission paths of the AN #1 (S614). That is, the step S614 may correspond to the steps S521 to S524 in FIG. 5A.

Then, the calibration controller 355 may receive a calibration completion report message from the calibration block 324-2 of the AN #1 among the L ANs (S615), and determine whether the time delay values and phase characteristic values of the transmission paths for all the L ANs have been measured (S616). As a result of the determination, if AN(s) to be measured remain, the steps S613 to S615 may be repeated for the remaining AN(s), and if the measurement for all the AN(s) is completed, calibration values determined based on the measured time delay values and phase characteristic values to the ANs through a calibration adjustment message (S617).

Figure 6B:
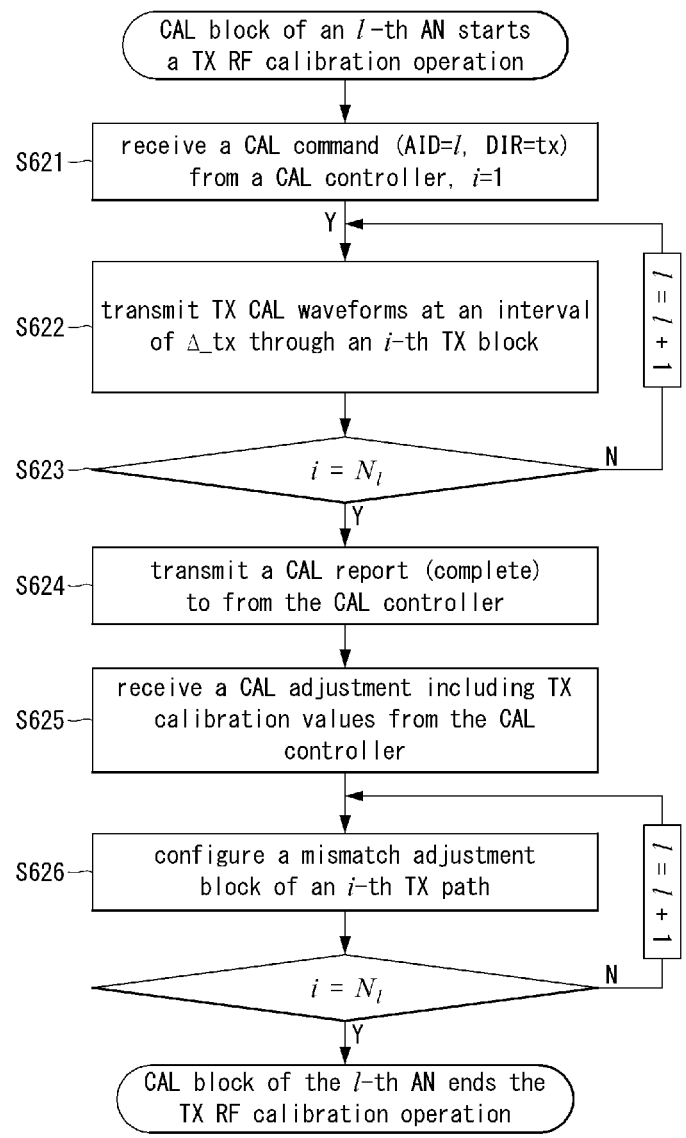
FIG. 6B is a flowchart illustrating an operation of a calibration block in the method of calibrating a mismatch of transmission paths according to FIG. 5A.

FIG. 6B is a flowchart illustrating an operation of a calibration block in the method of calibrating a mismatch of transmission paths according to FIG. 5A.

Referring to FIG. 6B, the calibration block 324-2 may receive a calibration command message (AID=l, Dir=Tx) from the calibration controller 355 (S621). That is, the step S621 may correspond to the step S510 in FIG. 5A.

Then, the calibration block 324-2 may sequentially transmit TX CAL waveform signals to the calibration controller 355 at an interval of $\Delta_{rx}$ through $N_l$ TX blocks (S622, S623). That is, the steps S622 and 623 may correspond to the steps S521 to S524 in FIG. 5A.

Then, the calibration block 324-2 may transmits a calibration completion report message to the calibration controller 355 (S624), and may receive a calibration adjustment message including calibration values according to the time delay and phase characteristics of the transmission paths of the AN #1 from the calibration controller 355 (S625).

Finally, the calibration block 324-2 may configure the mismatch adjustment blocks of the transmission paths corresponding to the received calibration values to complete the calibration of the transmission paths (S627).

FIG. 7A is a flowchart illustrating an operation of a calibration controller in the method of calibrating a mismatch of reception paths according to FIG. 5B.

Referring to FIG. 7A, the calibration controller 355 may identify L ANs subjected to the reception path mismatch calibration and a set of $N_l$ antennas/transceivers included in each AN (S711).

The calibration controller 355 may transmit a calibration command message (AID=all, DIR=Rx, REP=R) to the calibration blocks 324-2 of the L ANs (S712). That is, in the calibration command message (AID=all, Dir=Rx, REP=R) may indicate that calibration targets are all the ANs, target paths are reception paths, and the number of repeated transmissions of the reception path calibration signal (i.e., RX CAL waveform) is set to R.

Then, the calibration controller 355 may transmit the reception path calibration signals to all the ANs (S713). The calibration controller 355 may determine whether the reception path calibration signal has been transmitted as many times as the number R of repeated transmissions set by the calibration command message (S714). If the reception path calibration signal has not been transmitted by the set number R of repeated transmissions, the calibration controller 355 may repeatedly perform the steps S712 to S713 to additionally transmit the reception path calibration signals.

If the reception path calibration signals have been transmitted for the L ANs as many times as the set number R of repeated transmissions, the calibration controller 355 may receive a calibration completion report message including time delay values and phase characteristic values of the reception paths from the L ANs (S715).

Finally, the calibration controller 355 may transmit to the L ANs a calibration adjustment message including calibration values to which the measured time delay values and the phase characteristic values are reflected (S716).

FIG. 7B is a flowchart illustrating an operation of a calibration block in the method of calibrating a mismatch of reception paths according to FIG. 5B.

Referring to FIG. 7B, the calibration block 324-2 may receive a calibration command message (AID=all, DIR=Rx, REP=R) from the calibration controller 355 (S721). That is, the step S721 may correspond to the step S550 in FIG. 5B.

Then, the calibration block 324-2 may receive the reception path calibration signal (i.e., RX CAL waveform) for $N_l$ reception paths from the calibration controller 355 (S722). That is, the step S722 may correspond to the step S561 in FIG. 5A. The calibration block 324-2 may determine whether the reception path calibration signals as many as the set number R of repeated transmissions have been received (S723), and if the reception path calibration signals have not been received by the set number R of repeated transmissions, the calibration block 324-2 may repeatedly perform the step 722 to additionally receive the reception path calibration signals.

Then, the calibration block 324-2 may determine the time delay value and the phase characteristic value for each reception path, and may derive the maximum value $\max_{i,m} \tau_{RX\,i,m}$ among the time delay values and the maximum value $\max_{i,m} \phi_{RX\,i,m}$ among the phase characteristic values (S724).

The calibration block 324-2 may transmit to the calibration controller 355 a calibration completion report message including the maximum time delay value $\max_{i,m} \tau_{RX\,i,m}$ and the maximum phase characteristic value $\max_{i,m} \phi_{RX\,i\,m}$ (S725), and receive from the calibration controller 355 calibration value according to the time delay values and phase characteristic values of the transmission paths of the AN #1 from the calibration controller 355 through a calibration adjustment message (S726).

Finally, the calibration block 324-2 may configure the mismatch adjustment blocks of the reception paths corresponding to the received calibration values to complete the calibration of the reception paths (S727).

Channel Reciprocity Calibration

When the calibration of the distributed transmission paths and reception paths is completed according to the procedures described with reference to FIGS. 5A to 7B, the calibration controller 355 may be configured to calibrate a transmission/reception mismatch of transceivers of a specific AN. Such the mismatch calibration may be referred to as TDD channel reciprocity calibration. Hereinafter, a TDD channel reciprocity calibration operation of a specific AN through the calibration controller will be described with reference to FIGS. 8A and 8B.

Figure 8A:
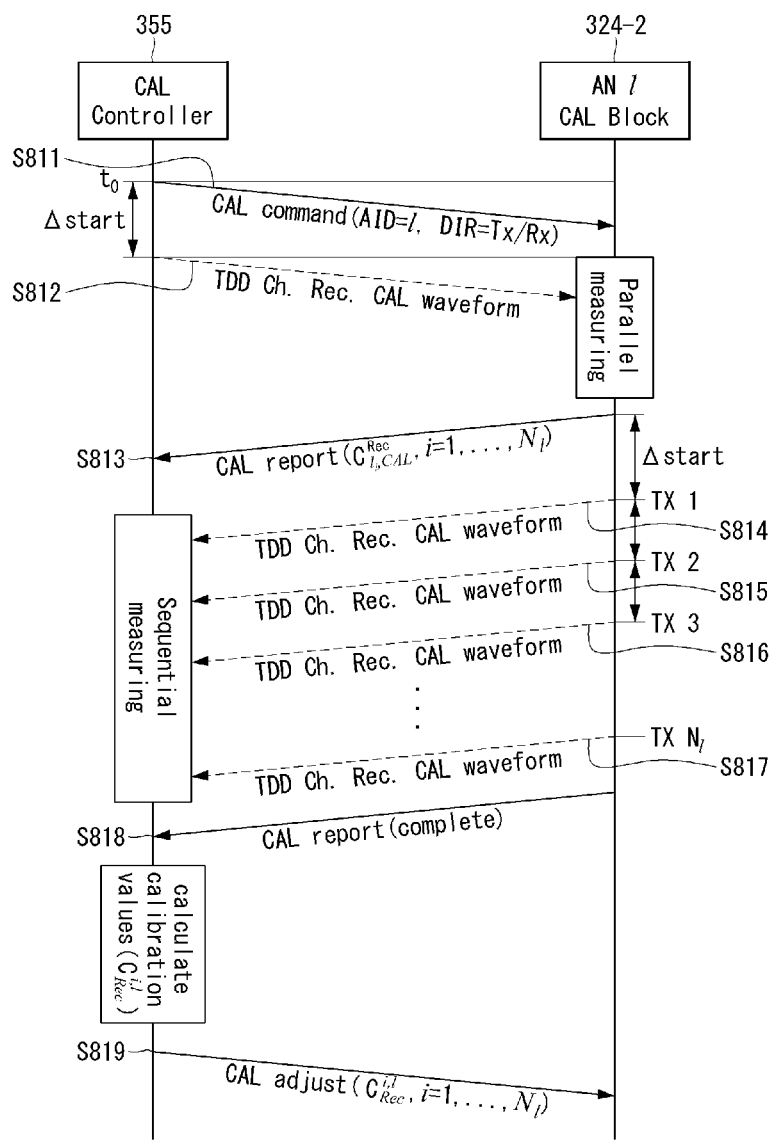
FIG. 8A is a sequence chart illustrating a method of performing calibration for TDD channel reciprocity in a serial fronthaul according to an exemplary embodiment of the present disclosure.

FIG. 8A is a sequence chart illustrating a method of performing calibration for TDD channel reciprocity in a serial fronthaul according to an exemplary embodiment of the present disclosure.

Referring to FIG. 8A, interworking between the calibration controller 355 and the calibration block 324-2 of the AN #1 for the TDD channel reciprocity mismatch measurement and calibration is shown.

The calibration controller 355 may transmit a calibration command message (AID=l, DIR=Tx/Rx) to the calibration block 324-2 of the AN #1 through the data and control signal line 312 to indicate measurement of a mismatch for TDD channel reciprocity (S811). Here, the DIR may be set to 'Tx/Rx' to indicate that the calibration command message is a TDD channel reciprocity mismatch measurement command.

The calibration controller 355 may transmit a TDD channel reciprocity calibration signal (i.e., TDD Ch. Rec. CAL waveform) through the calibration transmission (CAL TX) path (S812). The TDD channel reciprocity calibration signal may be distributed to the $N_I$ reception paths included in the AN #1 through the calibration signal line 311 of the serial fronthaul 310, and detected by the calibration blocks 324-2. A reception signal gain $C_{I_i,CAL}^{Rec}$ of the TDD channel reciprocity calibration signal received through the reception path RX i ($1 \le i \le N_I$) of the AN #1 may be expressed as in Equation 9 below.

$$C_{I_i,CAL}^{Rec} = C_{RX\ i,I} * C_{J_i} * C_{J_I\text{-}J_0} * C_{J_0} * C_{CAL\ TX} \quad \text{[Equation 9]}$$

In Equation 9, $C_{CAL\ TX}$ is a gain characteristic value of the calibration transmission (CAL TX) path of the calibration device 350, $C_{J_0}$ may be a gain characteristic value from the point of $S_{CAL}$ of the calibration device 350 to the point $J_0$, $C_{J_I\text{-}J_0}$ may be a gain characteristic value from the point $J_I$ to the point $J_0$, $C_{J_i}$ may be a gain characteristic value from the point of $S_{CAL}$ of the AN #1 to the point $J_I$, and $C_{RX\ i,I}$ may be a gain characteristic value of the reception path i of the AN #1. The above-described $C_{J_i}$, $C_{J_I\text{-}J_0}$, and $C_{J_0}$ may be well-known gain characteristic values, and are also gain characteristic values of a common path along with $C_{CAL\ TX}$. The calibration block 324-2 of the AN #1 may measure the gain characteristic values $C_{I_i,CAL}^{Rec}$, i=1, ..., $N_I$ of the TDD channel reciprocity calibration signal received through the $N_I$ reception paths, and may report these measured values to the calibration controller 355 through the data and control signal line 312 of the serial fronthaul by including them in a calibration report message (S813).

The calibration block 324-2 of the AN #1 may sequentially transmit the TDD channel reciprocity calibration signals through $N_I$ transmission paths (S814 to S817), and each TDD channel reciprocity calibration signal may be detected by the calibration controller 355 through the calibration reception (i.e., CAL RX) path of the calibration device 350. A reception signal gain $C_{CAL,I_i}^{Rec}$ of the TDD channel reciprocity calibration signal, which is transmitted by the transmission path TX i ($1 \le i \le N_I$) of the AN #1 and received by the calibration controller 355 through the calibration reception (i.e., CAL RX) path of the calibration device 350, may be expressed as in Equation 10 below according to the transmission path.

$$C_{CAL,I_i}^{Rec} = C_{CAL\ RX} * C_{J_0} * C_{J_I\text{-}J_0} * C_{J_i} * C_{TX\ i,I} \quad \text{[Equation 10]}$$

In Equation 10, $C_{CAL\ RX}$ may be a gain characteristic value of the calibration reception (i.e., CAL RX) path of the calibration device 350, $C_{J_0}$ may be a gain characteristic value from the point of $S_{CAL}$ of the calibration device 350 to the point $J_0$, $C_{J_I\text{-}J_0}$ may be a gain characteristic value from the point $J_I$ to the point $J_0$, $C_{J_i}$ may be a gain characteristic value from the point of $S_{CAL}$ of the AN #1 to the point $J_I$, and $C_{TX\ i,I}$ may be the gain characteristic value of the path TX i of the AN #1. The above-described $C_{J_i}$, $C_{J_I\text{-}J_0}$, and $C_{J_0}$ may be well-known gain characteristic values, and may also be gain characteristic values of a common path along with $C_{CAL\ RX}$. After transmitting the TDD channel reciprocity calibration signal on the $N_I$-th transmission path, the calibration block 324-2 may report the completion of transmission of the TDD channel reciprocity calibration signals by transmitting a calibration completion report message to the calibration controller 355 (S818). The calibration controller 355 may use $C_{I_i,CAL}^{Rec}$, i=1, ..., $N_I$, which are received through the calibration completion report message, and $C_{CAL,I_i}^{Rec}$, i=1, ..., $N_I$, which are identified by the measurements, to calculate gain calibration values $C_{Rec}^{i,I}$, i=1, ..., $N_I$ for the $N_I$ transceivers included in the AN #1 as in Equation 11 below.

$$C_{Rec}^{i,I} = \frac{C_{TX i,I}}{C_{RX i,I}} = \frac{C_{CAL,I_i}^{Rec}}{C_{I_i,CAL}^{Rec}} \frac{C_{CALRX}}{C_{CALTX}}, i = 1, \ldots, N_I \quad \text{[Equation 11]}$$

The gain calibration values for the $N_I$ transceivers may be transmitted to the calibration block 324-2 through a calibration adjustment message (S819), and the calibration block 324-2 may configure the calibration values as values for adjusting the gains of the corresponding mismatch adjustment blocks.

FIG. 8B is a flowchart illustrating an operation of a calibration controller in a method of performing calibration for TDD channel reciprocity in a serial fronthaul according to an exemplary embodiment of the present disclosure.

Referring to FIG. 8B, a procedure for calibrating TDD channel reciprocity mismatches of all ANs connected in a serial fronthaul based on the measurements on the TDD channel reciprocity mismatches of the respective ANs and the calculated calibration values therefor, which were described with reference to FIG. 8A is shown.

Referring to FIG. 8B, the calibration controller 355 may first determine whether calibration of the transmission paths and reception paths of the AN #1 connected in the serial fronthaul has been completed (S821).

If the calibration for the transmission paths and reception paths of the AN #1 connected in the serial fronthaul has been completed, the calibration controller 355 may transmit a calibration command message (ADI=l, DIR=Tx/Rx) to the calibration block 324-2 of the AN #1, and transmit a TDD channel reciprocity calibration signal (i.e., TDD Ch. Rec.

CAL waveform) to the calibration block 324-2 of the AN #1 through the calibration transmission path (i.e., CAL TX) (S823).

The calibration controller 355 may receive a calibration report message from the calibration block 324-2 of the AN #1 to identify gains $C_{CAL,l_i}^{Rec}$, i=1, . . . , $N_l$ of the reception paths of the AN #1 (S824).

The calibration controller 355 may receive the TDD channel reciprocity calibration signal through the i-th transmission path of the AN #1, and measure the gain of the transmission path (S825). The step S825 may be repeated for the $N_l$ transmission paths of the AN #1.

The calibration controller 355 may receive a calibration completion report message from the calibration block 324-2 of the AN #1, calculate the gain calibration values $C_{Rec}^{i,l}$, i=1, . . . , $N_l$ of the $N_l$ transmission paths of the AN #1 (S727), and may transmit a calibration adjustment message including the calculated gain calibration values to the AN #1 (S728).

Hierarchical Calibration

Figure 9:
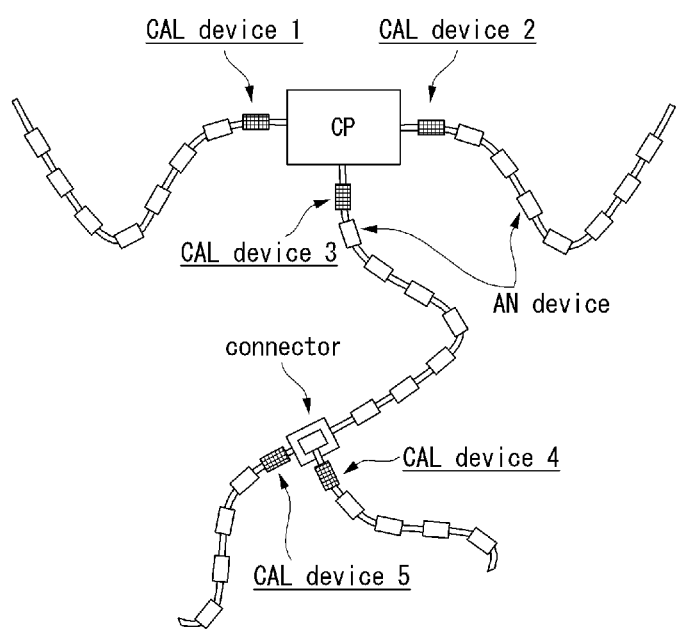
FIG. 9 is a conceptual diagram illustrating a connection structure of a serial fronthaul according to an exemplary embodiment of the present disclosure.

FIG. 9 is a conceptual diagram illustrating a connection structure of a serial fronthaul according to an exemplary embodiment of the present disclosure.

Referring to FIG. 9, an exemplary embodiment in which each serial fronthaul connects one calibration device (i.e., CAL device) and a plurality of ANs, a plurality of serial fronthaul are connected to a CP, and a plurality of serial fronthaul are connected via a connector is shown. That is, one CP may be connected with a serial fronthaul including a first calibration device (i.e., CAL device 1), a serial fronthaul including a second calibration device (i.e., CAL device 2), and a serial fronthaul including a third calibration device (i.e., CAL device 3). In particular, the serial fronthaul including the third calibration device is connected to a serial fronthaul including a fourth calibration device (i.e., CAL device 4) and a serial fronthaul including a fifth calibration device (i.e., CAL device 5) through a connector. In this case, calibration should be performed for all distributed ANs connected to the CP by the plurality of serial fronthaul links. Hereinafter, a procedure in which a plurality of calibration devices cooperate to calibrate distributed ANs will be described.

As one of calibration schemes for the system consisting of a plurality of serial fronthaul links as shown in FIG. 9, one CP may serve as a single calibration controller, and may use the methods proposed in FIGS. 3 to 8B to directly calibrate mismatches between all RF paths included in all ANs connected through the plurality of serial fronthaul links. Although the above method has the highest accuracy and reliability, as a time required for the mismatch calibration increases, scalability may be insufficient.

Accordingly, in order to maximize scalability, a hierarchical calibration scheme may be considered. For example, after mismatch calibration between the CP and the calibration devices (i.e., CAL devices 1 to 5) is first completed, the calibration devices may perform mismatch calibration with ANs of the respective local fronthauls (i.e., each calibration device performs mismatch calibration with ANs connected to the fronthaul including the corresponding calibration device) in parallel. The above-described calibration method in consideration of scalability will be described with reference to FIGS. 10 and 11.

Figure 10:
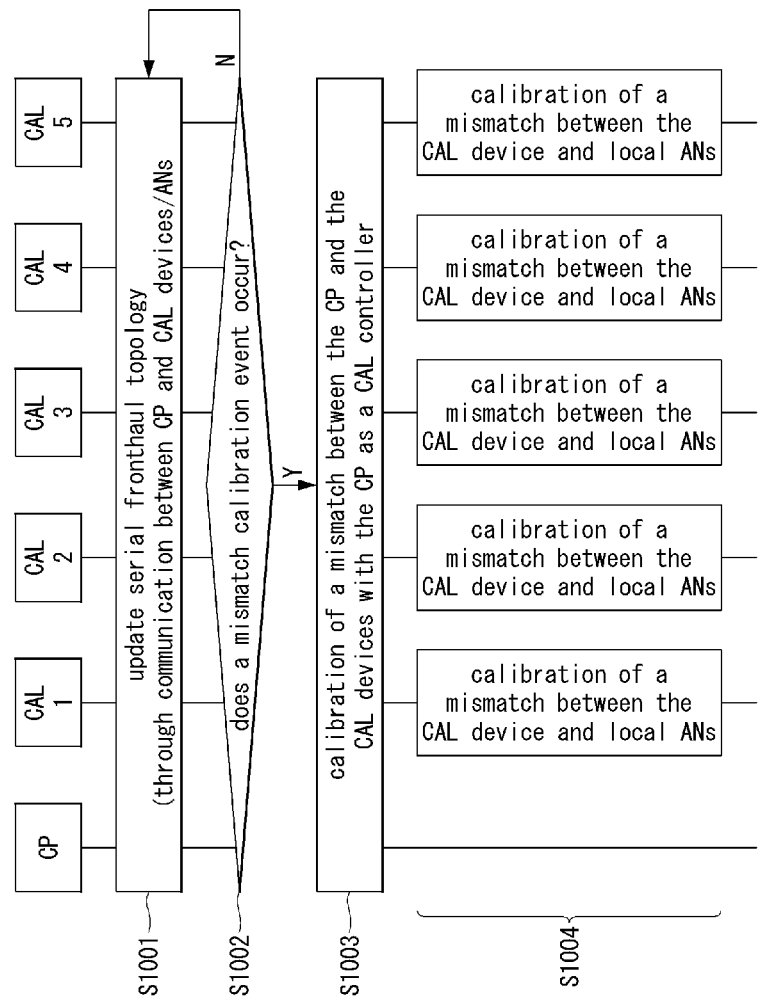
FIG. 10 is a conceptual diagram illustrating a hierarchical calibration method according to an exemplary embodiment of the present disclosure in a system including a plurality of serial fronthauls.

FIG. 10 is a conceptual diagram illustrating a hierarchical calibration method according to an exemplary embodiment of the present disclosure in a system including a plurality of serial fronthauls.

Referring to FIG. 10, a CP may identify a topology of serial fronthaul(s) included in a system through communication with all ANs and calibration devices (i.e., CAL 1 to 5) connected through the serial fronthaul(s) (S1001). The CP may determine occurrence of an event (i.e., mismatch calibration event) indicating that mismatch calibration is required such as expiration of a timer having a predetermined period or a change in the topology (S1002). When the mismatch calibration event occurs, the CP may use itself as a single calibration controller and perform a mismatch calibration procedure on the calibration devices CAL 1 to 5 included in the plurality of serial fronthauls (S1003). After the mismatch between all the calibration devices is calibrated through the above procedure, each of the calibration devices CAL 1 to 5 may perform mismatch calibration with the local ANs of the serial fronthaul including the corresponding calibration device (S1004). The above-described mismatch calibration between the calibration devices and their local ANs may be performed in parallel, so that the calibration procedure can be completed quickly.

Figure 11:
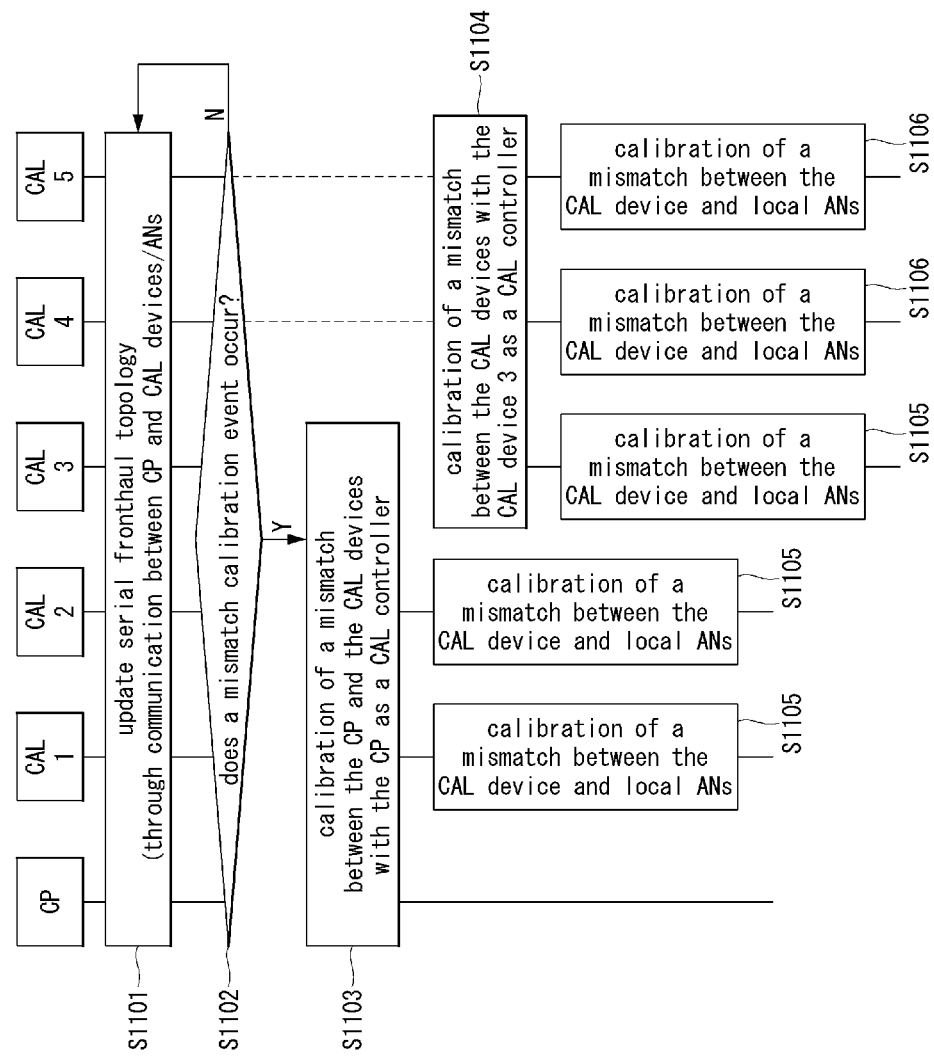
FIG. 11 is a conceptual diagram illustrating a hierarchical calibration method according to another exemplary embodiment of the present disclosure in a system including a plurality of serial fronthauls.

FIG. 11 is a conceptual diagram illustrating a hierarchical calibration method according to another exemplary embodiment of the present disclosure in a system including a plurality of serial fronthauls.

As shown in FIG. 9, the third calibration device (i.e., CAL device 3), the fourth calibration device (i.e., CAL device 4), and the fifth calibration device (i.e., CAL device 5) may be connected through the connector, and they may be connected to the CP through the serial fronthaul including the third calibration device (i.e., CAL device 3).

Referring to FIG. 11, the CP may identify the topology of the serial fronthaul(s) included in the system through communication with all ANs and calibration devices (i.e., CAL 1 to CAL 5) connected through the serial fronthauls (S1101). The CP may determine an occurrence of an event (i.e., mismatch calibration event) indicating that mismatch calibration is required such as expiration of a timer having a predetermined period or a change in the topology (S1102). When the mismatch calibration event occurs, the CP may use itself as a single calibration controller and perform a mismatch calibration procedure on the calibration devices CAL 1 to 3 included in the plurality of serial fronthauls directly connected with itself (S1003). Thereafter, the third calibration device (i.e., CAL 3) directly connected to the CP may serve as a calibration controller to perform mismatch calibration with the fourth calibration device (i.e., CAL 4) and the fifth calibration device (i.e., CAL 5) connected through the connector (S1104).

On the other hand, the first to third calibration devices that have directly completed the mismatch calibration with the CP may perform calibration with the ANs of the respective local serial fronthauls (S1105), and the fourth and fifth calibration devices that have completed the mismatch calibration with the CP through the third calibration device may also perform mismatch calibration with the ANs of the respective local serial fronthauls (S1106).

Figure 12:
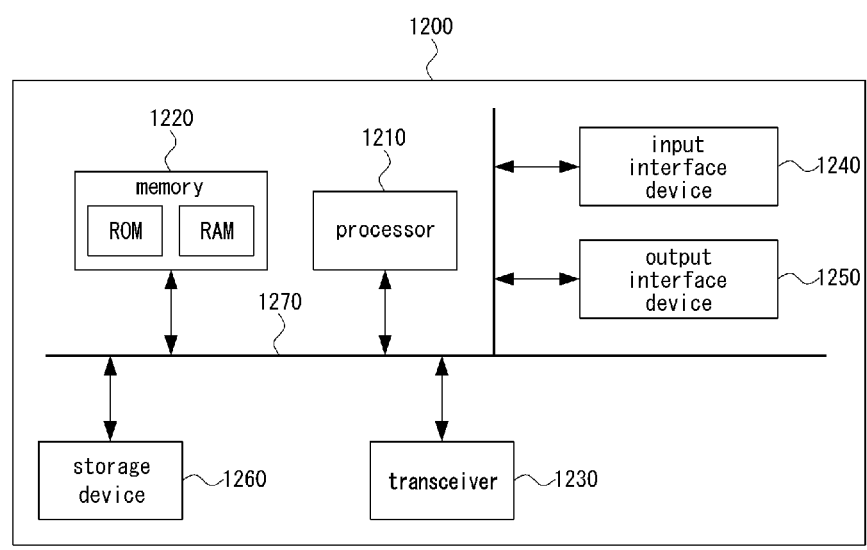
FIG. 12 is a block diagram illustrating a configuration of a communication node according to exemplary embodiments of the present disclosure.

FIG. 12 is a block diagram illustrating a configuration of a communication node according to exemplary embodiments of the present disclosure.

A communication node shown in FIG. 12 may be one of the calibration controller, AN, or CP, which were described above.

Referring to FIG. 12, a communication node 1200 may comprise at least one processor 1210, a memory 1220, and a transceiver 1230 connected to the network for performing communications. Also, the communication node 1200 may further comprise an input interface device 1240, an output interface device 1250, a storage device 1260, and the like. The respective components included in the communication node 1200 may communicate with each other as connected through a bus 1270. However, each component included in the communication node 1200 may be connected to the processor 1210 via an individual interface or a separate bus, rather than the common bus 1270. For example, the processor 1210 may be connected to at least one of the memory 1220, the transceiver 1230, the input interface device 1240, the output interface device 1250, and the storage device 1260 via a dedicated interface.

The processor 1210 may execute a program stored in at least one of the memory 620 and the storage device 1260. The processor 1210 may refer to a central processing unit (CPU), a graphics processing unit (GPU), or a dedicated processor on which methods in accordance with embodiments of the present disclosure are performed. Each of the memory 1220 and the storage device 1260 may be constituted by at least one of a volatile storage medium and a non-volatile storage medium. For example, the memory 1220 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for calibration in a serial fronthaul in which a calibration device and L (L is a natural number equal to or greater than 1) access node(s) (AN(s)) are serially connected, the method comprising:
    a step (a) of transmitting, by the calibration device, to at least part of the L AN(s), a calibration command message indicating calibration of transmission paths;
    a step (b) of determining, by the calibration device and the at least part of the L AN(s), time delay values and phase characteristic values of the transmission paths of the at least part of the L AN(s); and
    a step (c) of transmitting, by the calibration device, to the at least part of the L AN(s), a calibration adjustment message indicating calibration of the transmission paths based on the time delay values and the phase characteristic values of the transmission paths of the at least part of the L AN(s).

2. The method according to claim 1, wherein the step (b) further comprises:

a step (b-1) of transmitting, by an l-th AN of the at least part of the L AN(s), a transmission path calibration signal to the calibration device through each of $N_l$ transmission paths included in the l-th AN;
    a step (b-2) of determining, by the calibration device, a time delay value of an i-th transmission path among the $N_l$ transmission paths based on a difference between a transmission timing of the transmission path calibration signal at the l-th AN and a reception timing of the transmission path calibration signal at the calibration device; and
    a step (b-3) of determining, by the calibration device, a phase characteristic value of the i-th transmission path among the $N_l$ transmission paths based on a difference between a phase of the transmission path calibration signal at the transmission timing and a phase of the transmission path calibration signal at the reception timing.

3. The method according to claim 2, wherein the step (b) further comprises:
    a step (b-4) of reporting, by the l-th AN, time delay values and phase characteristic values of the $N_l$ transmission paths to the calibration device; and
    a step (b-5) of determining, by the calibration device, the time delay values and the phase characteristic values of the transmission paths of the at least part of the L AN(s) through the steps (b-1) to (b-4).

4. The method according to claim 2, wherein the transmission path calibration signals are sequentially transmitted at a time interval $\Delta_{tx}$ after a predetermined time $\Delta_{start}$ elapses from a transmission timing $t_0$ of the calibration command message.

5. The method according to claim 1, wherein the step (c) further comprises:
    a step (c-1) of determining, by the calibration device, a difference between a maximum time delay value among the time delay values of the transmission paths of the at least part of the L AN(s) and a time delay value of an i-th transmission path of an l-th AN of the at least part of the L AN(s) as a time delay calibration value for the i-th transmission path;
    a step (c-2) of determining, by the calibration device, a difference between a maximum phase characteristic value among the phase characteristic values of the transmission paths of the at least part of the L AN(s) and a phase characteristic value of the i-th transmission path of the l-th AN of the at least part of the L AN(s) as a phase characteristic calibration value for the i-th transmission path; and
    a step (c-3) of transmitting, by the calibration device, the time delay calibration value and the phase characteristic calibration value of the i-th transmission path to the l-th AN through a calibration adjustment message.

6. The method according to claim 1, wherein the serial fronthaul comprises:
    a timing clock signal line for clock synchronization between the calibration device and the L AN(s);
    a calibration signal line for transferring a calibration signal between the calibration device and the L AN(s); and
    a data and control signal line for transferring data and control signals for calibration between the calibration device and the L AN(s).

7. The method according to claim 1, wherein the calibration device exists as a separate hardware device, one of the L AN(s) serves as the calibration device, or a central processor (CP) connected to the L AN(s) through the serial fronthaul performs a role of the calibration device.

8. A method for calibration in a serial fronthaul in which a calibration device and L (L is a natural number equal to or greater than 1) access node(s) (AN(s)) are serially connected, the method comprising:
- a step (a) of transmitting, by the calibration device, to at least part of the L AN(s), a calibration command message indicating calibration of reception paths;
- a step (b) of determining, by the calibration device and the at least part of the L AN(s), time delay values and phase characteristic values of the reception paths of the at least part of the L AN(s); and
- a step (c) of transmitting, by the calibration device, to the at least part of the L AN(s), a calibration adjustment message indicating calibration of the reception paths based on the time delay values and the phase characteristic values of the reception paths of the at least part of the L AN(s).

9. The method according to claim 8, wherein the step (b) further comprises:
- a step (b-1) of transmitting, by the calibration device, a reception path calibration signal to an l-th AN of the at least part of the L AN(s) through each of $N_l$ reception paths included in the l-th AN;
- a step (b-2) of determining, by the l-th AN, a time delay value of an i-th reception path among the $N_l$ reception paths based on a difference between a transmission timing of the reception path calibration signal at the calibration device, which is received through the i-th reception path, and a reception timing of the reception path calibration signal at the calibration device;
- a step (b-3) of determining, by the l-th AN, a phase characteristic value of the i-th reception path among the $N_l$ reception paths based on a difference between a phase of the reception path calibration signal at the transmission timing and a phase of the reception path calibration signal at the reception timing; and
- a step (b-4) of determining, by the l-th AN, the time delay values and the phase characteristic values of the $N_l$ reception paths through the steps (b-1) to (b-3), and reporting the time delay values and the phase characteristic values of the $N_l$ reception paths to the calibration device.

10. The method according to claim 9, wherein when the calibration command message indicates a number R of repeated transmissions of the reception path calibration signal, the reception path calibration signal is repeatedly transmitted R times through the i-th reception path, and the time delay value and the phase characteristic value for the i-th reception path are determined based on R repeated transmissions of the reception path calibration signal.

11. The method according to claim 9, wherein the reception path calibration signals are sequentially transmitted at a time interval $\Delta_{rx}$ after a predetermined time $\Delta_{start}$ elapses from a transmission timing $t_0$ of the calibration command message.

12. The method according to claim 8, wherein the step (c) further comprises:
- a step (c-1) of determining, by the calibration device, a maximum time delay value among the time delay values of the reception paths of the at least part of the L AN(s) and a maximum phase characteristic value among the phase characteristic values of the reception paths of the at least part of the L AN(s);
- a step (c-2) of determining, by the calibration device, a difference between the maximum time delay value and a maximum time delay value of reception paths of an l-th AN of the at least part of the L AN(s) as a time delay calibration value for the l-th AN;
- a step (c-3) of determining, by the calibration device, a difference between the maximum phase characteristic value and a maximum phase characteristic value of the reception paths of the l-th AN of the at least part of the L AN(s) as a phase characteristic calibration value for the l-th AN; and
- a step (c-4) of transmitting, by the calibration device, the time delay calibration value and the phase characteristic calibration value to the l-th AN through a calibration adjustment message.

13. The method according to claim 8, wherein the serial fronthaul comprises:
- a timing clock signal line for clock synchronization between the calibration device and the L AN(s);
- a calibration signal line for transferring a calibration signal between the calibration device and the L AN(s); and
- a data and control signal line for transferring data and control signals for calibration between the calibration device and the L AN(s).

14. The method according to claim 8, wherein the calibration device exists as a separate hardware device, one of the L ANs serves as the calibration device, or a central processor (CP) connected to the L AN(s) through the serial fronthaul performs a role of the calibration device.

15. A method for calibration in a serial fronthaul in which a calibration device and L (L is a natural number equal to or greater than 1) access node(s) (AN(s)) are serially connected, the method comprising:
- a step (a) of transmitting, by the calibration device, to an l-th AN of the L AN(s), a calibration command message indicating calibration of a time division duplexing (TDD) channel reciprocity;
- a step (b) of measuring, by the calibration device and the l-th AN, gain characteristic values of $N_l$ reception paths and $N_l$ transmission paths included in the l-th AN; and
- a step (c) of determining, by the calibration device, a gain calibration value for each of the $N_l$ reception paths based on the gain characteristic values of the $N_l$ reception paths and the $N_l$ transmission paths, and transmitting a calibration adjustment message including the gain calibration value to the l-th AN.

16. The method according to claim 15, wherein the step (b) comprises:
- transmitting, by the calibration device, to the l-th AN a TDD channel reciprocity calibration signal through the $N_l$ reception paths included in the l-th AN;
- reporting, by the l-th AN, a reception signal gain measurement value of the TDD channel reciprocity calibration signal for each of the $N_l$ reception paths;
- transmitting, by the l-th AN, to the calibration device a TDD channel reciprocity calibration signal through the $N_l$ transmission paths included in the l-th AN; and
- measuring, by the calibration device, a reception signal gain measurement value of the TDD channel reciprocity calibration signal for each of the $N_l$ transmission paths.

17. The method according to claim 16, wherein the TDD channel reciprocity calibration signals are sequentially transmitted at a time interval $\Delta_{tx}$ after a predetermined time $\Delta_{start}$ elapses from a transmission timing $t_0$ of the calibration command message or a timing of reporting the reception signal gain measurement value.

18. The method according to claim 15, wherein the serial fronthaul comprises:
- a timing clock signal line for clock synchronization between the calibration device and the L AN(s);
- a calibration signal line for transferring a calibration signal between the calibration device and the L AN(s); and
- a data and control signal line for transferring data and control signals for calibration between the calibration device and the L AN(s).

19. The method according to claim 15, wherein the calibration device exists as a separate hardware device, one of the L ANs serves as the calibration device, or a central processor (CP) connected to the L AN(s) through the serial fronthaul performs a role of the calibration device.

20. The method according to claim 15, wherein downlink channel information for the L AN(s) is estimated from uplink channel information for the L AN(s) using the TDD channel reciprocity.

* * * * *